United States Patent
Wiktor et al.

(10) Patent No.: US 11,611,274 B2
(45) Date of Patent: Mar. 21, 2023

(54) METHODS AND APPARATUS TO START CONVERTERS INTO A PRE-BIASED VOLTAGE

(71) Applicant: Texas Instruments Incorporated, Dallas, TX (US)

(72) Inventors: Stefan Wlodzimierz Wiktor, Raleigh, NC (US); Brian Thomas Lynch, Brookline, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 151 days.

(21) Appl. No.: 17/143,418

(22) Filed: Jan. 7, 2021

(65) Prior Publication Data

US 2021/0126524 A1    Apr. 29, 2021

Related U.S. Application Data

(62) Division of application No. 16/399,482, filed on Apr. 30, 2019, now Pat. No. 10,917,005.

(Continued)

(51) Int. Cl.
| | |
|---|---|
| *H02M 1/36* | (2007.01) |
| *H02M 3/157* | (2006.01) |
| *H02M 3/158* | (2006.01) |
| *H02M 3/156* | (2006.01) |
| *H02M 1/00* | (2006.01) |

(52) U.S. Cl.
CPC .............. *H02M 1/36* (2013.01); *H02M 3/156* (2013.01); *H02M 3/157* (2013.01); *H02M 3/158* (2013.01); *H02M 1/0025* (2021.05)

(58) Field of Classification Search
CPC ........ H02M 1/36; H02M 3/156; H02M 3/157; H02M 3/158; H02M 1/0025; H02M 1/0003
See application file for complete search history.

(56) References Cited

U.S. PATENT DOCUMENTS

| | | |
|---|---|---|
| 9,306,548 B1 | 4/2016 | Wiktor |
| 9,647,556 B2 | 5/2017 | Li |
| (Continued) | | |

FOREIGN PATENT DOCUMENTS

| | | |
|---|---|---|
| CN | 206332611 U | 7/2017 |
| CN | 107359786 A | 11/2017 |

*Primary Examiner* — Alex Torres-Rivera
(74) *Attorney, Agent, or Firm* — Ray A. King; Frank D. Cimino

(57) ABSTRACT

Methods, apparatus, systems and articles of manufacture are disclosed to start converter into a pre-biased voltage. The disclosed methods, apparatus, systems and articles of manufacture provide an apparatus comprising: an error amplifier including a feedback network and a differential difference amplifier (DDA), the DDA coupled to a power converter, a voltage generator, and the feedback network coupled to the third input of the DDA, the fourth input of the DDA, and the output of the DDA; a multiplexer coupled to the voltage generator, the second input of the DDA, and the first input of the DDA; a first switch coupled in parallel to the feedback network; a second switch coupled to a delay cell and an oscillator; and a trigger including an output, the trigger coupled to the voltage generator, the power converter, and the output of the trigger coupled to the multiplexer, first switch, and the second switch.

7 Claims, 9 Drawing Sheets

Related U.S. Application Data

(60) Provisional application No. 62/791,925, filed on Jan. 14, 2019.

(56) References Cited

U.S. PATENT DOCUMENTS

| | | | |
|---|---|---|---|
| 9,991,777 B2 | 6/2018 | Lynch | |
| 10,075,073 B2 | 9/2018 | Guan | |
| 2004/0140719 A1* | 7/2004 | Vulih | H02J 9/04 |
| | | | 307/80 |
| 2007/0064454 A1* | 3/2007 | Chen | H02M 3/156 |
| | | | 323/901 |
| 2008/0238397 A1* | 10/2008 | Chen | H02M 1/36 |
| | | | 323/288 |
| 2010/0045252 A1* | 2/2010 | Yamamoto | H02M 3/156 |
| | | | 323/282 |
| 2011/0006746 A1* | 1/2011 | Lu | H02M 1/36 |
| | | | 323/288 |
| 2014/0070776 A1* | 3/2014 | Hsu | H02M 3/1588 |
| | | | 323/271 |
| 2018/0278045 A1* | 9/2018 | Watanabe | H02M 1/08 |

* cited by examiner

METHODS AND APPARATUS TO START CONVERTERS INTO A PRE-BIASED VOLTAGE

RELATED APPLICATION

This patent application is a divisional of U.S. application Ser. No. 16/399,482, filed Apr. 30, 2019;

Which claims the benefit of U.S. Provisional Application Ser. No. 62/791,925, which was filed on Jan. 14, 2019. U.S. Provisional Application Ser. No. 62/791,925 is hereby incorporated herein by reference in its entirety. Priority to U.S. Provisional Application Ser. No. 62/791,925 is hereby claimed.

FIELD OF THE DISCLOSURE

This disclosure relates generally to delay based pulse width modulated power converters and, more particularly, to methods and apparatus to start converters into a pre-biased voltage.

BACKGROUND

Power converters (e.g., buck converters, buck-boost converters, etc.) and/or various power electronic devices operate in response to a pulse width modulated signal generated by a pulse width modulated (PWM) signal generator. In some power converters and/or various power electronic device applications, switches (e.g., transistors) are controlled by ramp-based PWM techniques (e.g., analog controlled). Recently, manufactures of power converters and/or various power electronic based devices have developed PWM techniques based on a delay as an alternative to ramp-based PWM techniques. Delay-based PWM techniques involve utilizing a delayed PWM generator to generate a signal in which the pulse width is a function of a delay.

BRIEF DESCRIPTION OF THE DRAWINGS

The figures are not to scale. In general, the same reference numbers will be used throughout the drawing(s) and accompanying written description to refer to the same or like parts.

Figure 1:
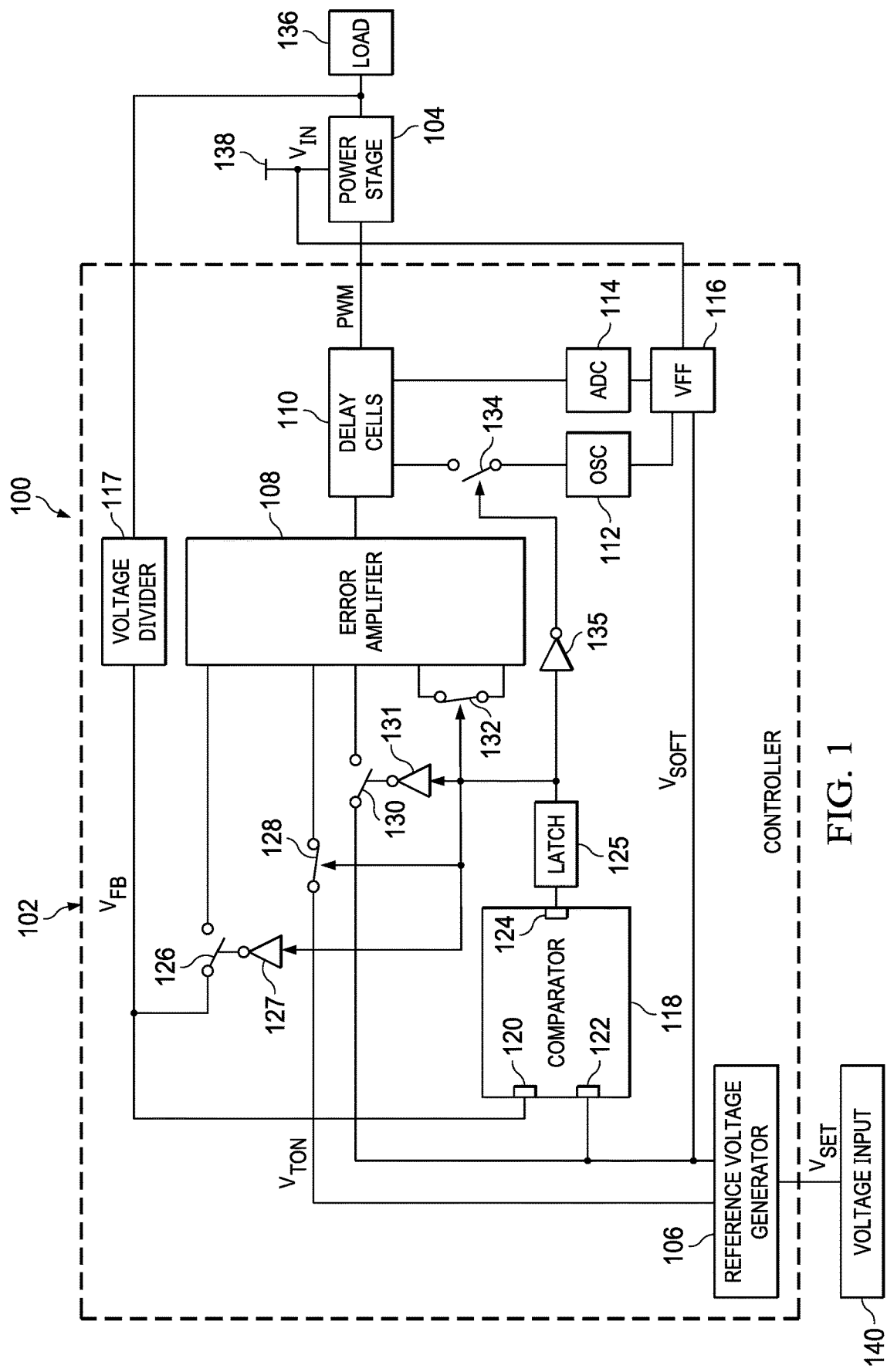
FIG. 1 is a block diagram of an example power converter system including an example controller.

Descriptors first, second, third, etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor first may be used to refer to an element in the detailed description, while the same element may be referred to in a claim with a different descriptor such as second or third. In such instances, it should be understood that such descriptors are used merely for ease of referencing multiple elements or components.

DETAILED DESCRIPTION

Typical direct current to direct current (DC-DC) converters and/or other power electronic devices (e.g., alternating current (AC) inverters) utilize a number of switches (e.g., transistors) controlled by a controller that generates PWM signal. In such applications, the controller includes a PWM signal generator to generate and/or otherwise supply the PWM signal to the converter in response to monitoring the output voltage of the coupled DC-DC converter. In some applications, the PWM signal generator is a delay pulse width modulator (DPWM) (e.g., a pulsed width modulator to generate a pulse width modulated signal based on a delay time and/or period, a delay-based pulse width modulator) rather than a traditional analog-based PWM signal generator. A DPWM is advantageous as compared to an analog-based PWM signal generator because a DPWM is capable of producing narrower pulses in a PWM signal (e.g., a pulse less than 30 nanoseconds) without jitter, whereas an analog-based PWM signal generator is typically not capable of producing such narrow pulses.

Rather than producing a PWM signal by comparing a control signal voltage with a ramp-based signal (e.g., a saw tooth signal), as done by analog-based PWM generators, a DPWM creates and/or otherwise generates a PWM signal by introducing a delay corresponding to a desired pulse width. A DPWM includes delay cells controllable by at least one control signal. The control signal is generated by a controller and indicates the length of delay each of the plurality of delay cells is to introduce (e.g., 1.0 nanoseconds, 1.2 nanoseconds, etc.). In some examples, the DPWM is included in the controller.

In some situations, there may be a voltage applied to the output of the power converter prior to the controller enabling the power converter. For example, a processor integrated circuit (IC) requires a first voltage level (e.g., 1.2 volts) for core power, but a second voltage level (e.g., 3.3 volts) for input and output power. In such an example, during start up, the first voltage level may be reached before the second voltage is enabled. Internal circuitry and/or leakages in the processor IC may cause sub-circuits of the processor IC coupled to a node that is to be at the second voltage level to be at or below the first voltage level.

Situations such as this present a problem for the power converter because the controller traditionally controls the power converter by ramping the duty cycle of the converter from a value corresponding to zero volts to meet the duty cycle of the desired output voltage. Many power converters employ synchronous rectification which allows current to flow from the output toward the input of the power converter during certain states of the power converter. While synchronous rectification is beneficial during steady state operation of the power converter, it causes problems during the start up of the converter when there is a pre-biased voltage level at the output. The problem arises because the duty cycle at start up does not correspond to the voltage that is at the output of the power converter. This difference in voltage level causes the current from the output of the power converter to flow from the output of the power converter to the input (e.g., the current is negative with respect to the converter, the power converter sinks current from the pre-biased voltage level at the load). This is disadvantageous because the controller for the power converter may not be designed to support control under discontinuous conduction mode (DCM) operation. Conventional PWM methods cannot accommodate for this negative current flow in DCM operation because it is impractical to set the PWM signal to a desired value prior to being connected to the power converter.

Examples disclosed herein allow for power converters to start up when connected to a pre-biased output. Examples disclosed herein provide an apparatus comprising: an error amplifier including a feedback network and a differential difference amplifier (DDA), the DDA including a first input, a second input, a third input, a fourth input, and an output, the second input of the DDA configured to be coupled to an output of a power converter, the third input of the DDA configured to be coupled to a first output of a voltage generator, and the feedback network coupled to the third input of the DDA, the fourth input of the DDA, and the output of the DDA; a multiplexer including a control terminal, the multiplexer configured to be coupled to a second output of the voltage generator, the multiplexer coupled to the second input of the DDA and the first input of the DDA; a first switch including a control terminal, the first switch coupled in parallel to the feedback network; a second switch including a control terminal, the second switch configured to be coupled to a delay cell and an oscillator; and a trigger including an output, the trigger configured to be coupled to the second output of the voltage generator, the output of the power converter, and the output of the trigger coupled to the control terminal of the multiplexer, the control terminal of the first switch, and the control terminal of the second switch.

The disclosed methods, apparatus, and articles of manufacture disclosed herein do not clamp the output of the error amplifier to a specified value corresponding to a voltage level higher than the output voltage level, rather the examples disclosed herein allow the error amplifier to control the duration of the delay cells in a DPWM based on a reference voltage until the pulse width of the DPWM is at or above the a value associated with a voltage level on the output of the power converter that is greater than or equal to the pre-biased voltage. Furthermore, example disclosed herein prevent the error amplifier from slewing to a voltage level that is across the error amplifier, thereby preventing transients on the output of the power converter.

Additionally, the examples disclosed herein prevent negative current (e.g., reverse current) and by disabling the power converter until a soft startup voltage corresponding to the power converter is equal to or greater than a voltage level corresponding to the pre-bias voltage. Consistent with the present disclosure, coupled is defined as connected directly or indirectly (e.g., through one or more intervening structures and/or layers, such as resistors, capacitors, inductors, transistors, voltage clamps, switches, buffers amplifiers, etc.). Consistent with the present disclosure, soft startup and/or its derivatives (e.g., soft start, soft-start, soft-startup, soft starting, etc.) refer to structures or functions that control the rate of current flow and therefore the rate of change of the output voltage when a switch starts to conduct and prevents the current level from overshooting a pre-determined and/or sensed value that does not damages the components of the switch or components coupled to the switch. Consistent with the present disclosure, equal is defined as the relationship between two or more quantities that are within a percentage tolerance of one another (e.g., a 5% tolerance).

FIG. 1 is a block diagram of an example power converter system 100 including an example controller 102. The example power converter system 100 further includes an example power stage 104, an example load 136, an example power supply 138, and an example voltage input 140. The example controller 102 controls the power stage 104 to provider a desired voltage level to the load 136, where the desired voltage level is based on a preset or predetermined voltage level $V_{SET}$ obtained by the controller 102 at the voltage input 140. The example controller 102 includes an example reference voltage generator 106, an example error amplifier 108, an example delay cells 110, an example oscillator 112, an example analog-to-digital converter (ADC) 114, an example feed forward voltage controller 116, an example voltage divider 117, an example comparator 118 including an example first input 120, an example second input 122, and an example output 124, an example latch 125, an example first switch 126, an example first inverter 127, an example second switch 128, an example third switch 130, an example second inverter 131, an example fourth switch 132, an example fifth switch 134, and an example third inverter 135.

In the illustrated example of FIG. 1, the example controller 102 is coupled to the example power stage 104. In the example of FIG. 1, the example power stage 104 is coupled to the example controller 102, the example load 136, and the example power supply 138. In the example of FIG. 1, the example reference voltage generator 106 is coupled to the example voltage input 140, the example error amplifier 108 via the example second switch 128 and the example third switch 130, the example feed forward voltage controller 116, and the second input 122 of the example comparator 118. In the example of FIG. 1, the example error amplifier 108 is coupled to the example power stage 104 via the example first switch 126, the example reference voltage generator 106 via the example second switch 128 and the example third switch 130, the example delay cells 110, and the example fourth switch 132.

In the illustrated example of FIG. 1, the example delay cells 110 is coupled to the example error amplifier 108, the example oscillator 112 via the example fifth switch 134, the example ADC 114, and the example power stage 104. In the example illustrated in FIG. 1, the example oscillator 112 is coupled to the example delay cells 110 via the example fifth switch 134 and the example feed forward voltage controller 116. In the example of FIG. 1, the example ADC 114 is coupled to the example delay cells 110 and the example feed forward voltage controller 116. In FIG. 1, the example feed forward voltage controller 116 is coupled to the example reference voltage generator 106, the example oscillator 112, the example ADC 114, and the example power supply 138. In the example of FIG. 1, the first input 120 of the example comparator 118 is coupled to the example power stage 104 via the voltage divider 117. Additionally, in the example of FIG. 1, the second input 122 of the example comparator 118 is coupled to the example reference voltage generator 106. In the example of FIG. 1, the output 124 of the comparator 118 is coupled to the example latch 125. The example latch 125 is coupled to the example first switch 126 via the first inverter 127, the example second switch 128, the example third switch 130 via the second inverter 131, the example fourth switch 132, and the example fifth switch 134 via the third inverter 135.

In the illustrated example of FIG. 1, each of the example first switch 126, the example second switch 128, the example third switch 130, the example fourth switch 132, and the example fifth switch 134 include a first terminal (e.g., a current terminal), a second terminal (e.g., a current terminal), and a third terminal (e.g., a control terminal). In the illustrated example, the first terminal of the example first switch 126 is coupled to the example power stage 104 via the voltage divider 117, the second terminal of the example first switch 126 is coupled to the example error amplifier 108, and the third terminal of the example first switch 126 is coupled to the output 124 of the example comparator 118 via the latch 125 and the first inverter 127. In the illustrated example, the first terminal of the example second switch 128 is coupled to the example reference voltage generator 106, the second terminal of the example second switch 128 is coupled to the example error amplifier 108, and the third terminal of the example second switch 128 is coupled to the output 124 of the example comparator 118 via latch 125. In the illustrated example, the first terminal of the example third switch 130 is coupled to the example reference voltage generator 106, the second terminal of the example third switch 130 is coupled to the example error amplifier 108, and the third terminal of the example third switch 130 is coupled to the output 124 of the example comparator 118 via the latch 125 and the second inverter 131. In the illustrated example, the first terminal of the example fourth switch 132 is coupled to the example error amplifier 108, the second terminal of the example fourth switch 132 is coupled to the example error amplifier 108, and the third terminal of the example fourth switch 132 is coupled to the output 124 of the example comparator 118 via the latch 125. In the illustrated example, the first terminal of the example fifth switch 134 is coupled to the example oscillator 112, the second terminal of the example fifth switch 134 is coupled to the example delay cells 110, and the third terminal of the example fifth switch 134 is coupled to the output 124 of the example comparator 118 via the latch 125 and the third inverter 135.

In the example illustrated in FIG. 1, the power stage 104 is a DC-DC converter controlled by the controller 102. The power stage 104 receives power to be converted from the power supply 138. In examples disclosed herein, the power stage 104 is a DC-DC power converter such as a boost converter, buck-boost converter, etc. Alternatively, the power stage 104 may be any power stage (e.g., DC-DC converter, an AC-DC converter, an AC-AC converter, etc.) in any suitable telecom application, datacom application, server, automotive application (e.g., traction inverter in an electric vehicle (EV)), industrial application (e.g., bridge inverter, motor drive, etc.). In other examples, the power stage 104 may be two synchronous switches, additional power converter control logic, or a combination thereof. In FIG. 1, the power stage 104 produces the output voltage signal. Additionally, the output voltage signal is monitored by the controller 102 and, more specifically, the error amplifier 108 as a feedback voltage signal $V_{FB}$. In the example illustrated in FIG. 1, the load 136 may be an LED array in an EV, a motor, a server, industrial and/or residential appliances, a datacom server, or any suitable load. In other examples, the load 136 may be one or more inductors, capacitors, resistors, or a combination thereof to filter the output of the power stage 104.

In the illustrated example of FIG. 1, the example power supply 138 is an unregulated linear power supply. For example, the power supply 138 is the output of diode rectifier. In other examples, other power supplies may be used that are suitable to the application. The example power supply 138 generates an input voltage signal $V_{IN}$.

In the example illustrated in FIG. 1, the reference voltage generator 106 is a combination of one or more voltage regulators, amplifiers, comparators, and other logic that regulates one or more voltage levels in the controller 102. For example, the reference voltage generator 106 generates a first voltage signal $V_{SOFT}$ at a first voltage level. For example, the first voltage signal $V_{SOFT}$ is at a reference voltage level corresponding to soft startup of the power stage 104 such that the power stage 104 ramps up to a desired and/or predetermined voltage level (e.g., a voltage level corresponding to the voltage level of the $V_{SET}$ signal). Additionally, the example reference voltage generator 106 generates a trimmed voltage signal $V_{TON}$ (e.g., at a second voltage level) to serve as a reference voltage level for the error amplifier 108. In examples disclosed herein, the trimmed voltage signal $V_{TON}$ generated by the reference voltage generator 106 is temperature compensated (e.g., altered and/or otherwise changes in response to a change in external temperature and/or the temperature of a silicon die). For example, as the temperature of the delay cells 110 increases and/or decreases from a previous temperature, the trimmed voltage signal $V_{TON}$ generated by the reference voltage generator 106 changes accordingly to ensure proper operation throughout all temperatures. For example, the trimmed voltage signal $V_{TON}$ generated by the reference voltage generator 106 corresponds to a desired duration (e.g., 1.2 nanoseconds) for each of the delay cells 110. Moreover, the trimmed voltage signal $V_{TON}$ generated by the example reference voltage generator 106 changes across different temperatures to maintain the desired duration for each of the delay cells 110. For example, when the temperature of the delay cells 110 increases, the trimmed voltage signal $V_{TON}$ generated by the reference voltage generator 106 decreases to maintain a desired duration of the delay cells 110. In the alternative, when the temperature of the example delay cells 110 decreases, the trimmed voltage signal $V_{TON}$ generated by the reference voltage generator 106 increases to maintain a desired duration on the delay cells 110. In additional or alternative examples, the trimmed voltage signal $V_{TON}$ generated by the reference voltage generator 106 increases to compensate an increase of the temperature of the delay cells 110 and decreases to compensate a decrease of the temperature of the delay cells 110.

In the example illustrated in FIG. 1, the example error amplifier 108 is a circuit that generates a control signal based on one or more inputs from the example power stage 104 and the reference voltage generator 106. For example, the error amplifier 108 may be a combination of a resistor, capacitor, and/or inductor feedback network and a conventional operational amplifier. In other examples, the error amplifier may be a combination of a resistor, capacitor, and/or inductor feedback network and a differential difference amplifier. During steady state operation, if the output voltage signal of the power stage 104 deviates away from the desired level (e.g., if the feedback voltage signal $V_{FB}$ increases and/or decreases above normal operating levels during transients), then the error amplifier 108 adjusts the control signal to account for such a change in the output voltage signal. In some examples disclosed herein, the error amplifier 108 may include a plurality of error amplifiers such as a two-pole, 1-zero amplifier and/or a one-pole, one-zero amplifier to generate the control signal.

In the illustrated example of FIG. 1, the example delay cells 110 includes a plurality of example delay cells to generate a PWM signal. In examples disclosed herein, the delay cells 110 generate the PWM signal by introducing a delay to an example oscillator signal based on one or more of the input voltage $V_{IN}$, the signal generated by the oscillator 112, and the first voltage signal $V_{SOFT}$ (e.g., more generally, the output of the ADC 114). The delay cells 110 are used to provide the PWM signal to the power stage 104 to provide power to an example load 136. In the example of FIG. 1, the duration of each delay cell of the delay cells 110 is determined based on the control signal generated by the error amplifier 108.

In the illustrated example of FIG. 1, the oscillator 112 is a phase lock looped oscillator. In other examples, the oscillator 112 is a capacitor (RC) oscillator, a ring oscillator, a crystal oscillator, or any other suitable oscillator for the application. In FIG. 1, the oscillator 112 produces an oscillating signal. In FIG. 1, the oscillating signal may be a periodic and/or aperiodic signal generated to initiate the generation of the PWM signal and/or otherwise set the frequency at which the delay cells 110 operates. For example, when the oscillator 112 outputs the oscillating signal, the delay cells 110 generate a corresponding rising edge on the PWM signal when the oscillating signal is at a falling edge. In such an example, the PWM signal is maintained at a logic high value for the duration of delay associated with number of the delay cells 110 active. The number of the delay cells 110 active is indicated by the example ADC 114.

In the illustrated example of FIG. 1, the example ADC 114 is a current analog to digital converter. The ADC 114 converts an analog current level to a digital output (e.g., a binary count value). For example, the example ADC 114 converts the analog current level to an eight-bit binary signal to indicate the number of the delay cells 110 to be active. In other examples disclosed herein, the ADC 114 may be any other suitable decoder that indicates the number of the delay cells 110 to be active.

In the example illustrated in FIG. 1, the example feed forward voltage controller 116 is an analog multiplier. The feed forward voltage controller 116 produces an analog current signal for use by the ADC 114. For example, the feed forward voltage controller 116 produces the analog current signal based on one or more of the first voltage signal first voltage signal $V_{SOFT}$, the input voltage signal $V_{IN}$, the frequency of the oscillator signal generated by the oscillator 112, and one or more constants corresponding to scaling factors. The scaling factors are suited to the design of the controller 102. For example, the scaling factors are related to the duration of each of the delay cells 110. The example feed forward voltage controller 116 sets the number of the delay cells 110 to be active via the ADC 114. In this manner, the example feed forward voltage controller 116, via the ADC 114, sets the delay (e.g., the duration) of the pulse width of the PWM signal generated by the delay cells 110 by setting the number of the delay cells 110 to be active. In this manner, the delay cells 110 generate the PWM signal by introducing a delay to the example oscillator signal that is based on the output of the feed forward voltage controller 116 (e.g., based on the input voltage $V_{IN}$, the signal generated by the oscillator 112, and the first voltage signal $V_{SOFT}$).

In the example of FIG. 1, the example voltage divider 117 is a resistive divider network that allows the voltage level at the output voltage of the power stage 104 to be measured and/or otherwise monitored by the error amplifier 108 and/or more generally, the controller 102 without a possibility of damaging the error amplifier 108 and/or more generally, the controller 102.

In the illustrated example of FIG. 1, the comparator 118 is an analog comparator. In other examples, the comparator 118 is a digital comparator, a comparator controller, a trigger (e.g., a Schmitt trigger), one or more integrated circuits, logic circuits, microprocessors, graphic processing units (GPUs), digital signal processors (DSPs), or controllers from any desired family or manufacturer. The comparator 118 may be a semiconductor based (e.g., silicon based) device. The comparator 118 compares the feedback voltage signal $V_{FB}$ received at the first input 120 and the first voltage signal $V_{SOFT}$ received at the second input 122 and determines whether the magnitude of the first voltage signal $V_{SOFT}$ is within a threshold value of the feedback voltage signal $V_{FB}$. For example, the threshold voltage corresponds to an acceptable difference between the magnitude of the first voltage signal $V_{SOFT}$ and the magnitude of the feedback voltage signal $V_{FB}$ based on the application. The example comparator 118 also configures one or more of the first switch 126, the second switch 128, the third switch 130, the fourth switch 132, or the fifth switch 134 based on at least the comparison of the first voltage signal $V_{SOFT}$ and the feedback voltage signal $V_{FB}$ via a control signal generated at the output 124. In additional or alternative examples, the example comparator 118 configures one or more of the first switch 126, the second switch 128, the third switch 130, the fourth switch 132, or the fifth switch 134 at the start of operation of the controller 102 via the control signal generated at the output 124.

In the example of FIG. 1, the latch 125 is a device that maintains a logic value at the output of the latch 125 corresponding to the logic value received at the input of the latch 125. For example, the latch 125 is an SR latch. In other example, the latch 125 is a D-flip-flop, a JK latch, a gated SR latch, a gated JK latch, a gated D-flip-flop, an Earle latch, or any other suitable latch.

In the illustrated example of FIG. 1, each of the first switch 126, the second switch 128, the third switch 130, the fourth switch 132, and the fifth switch 134 can be implemented by a transistor. For example, each of the first switch 126, the second switch 128, the third switch 130, the fourth switch 132, and the fifth switch 134 is a negative channel (n-channel) metal-oxide-semiconductor field-effect-transistor (MOSFET). In other examples, the first switch 126, the second switch 128, the third switch 130, the fourth switch 132, and the fifth switch 134 may be implemented by bipolar junction transistors (BJTs), junction-gate field-effect-transistors (JFETs), heterojunction bipolar transistors (HBTs), any suitable transistor for the application, and/or any combination thereof. Although many combinations of BJTs, JFETs, HBTs, or any suitable transistors may be used to implement one or more of the first switch 126, the second switch 128, the third switch 130, the fourth switch 132, or the fifth switch 134, it may desirable in a particular controller to implement each of the first switch 126, the second switch 128, the third switch 130, the fourth switch 132, and the fifth switch 134 with the same switch type (e.g., all n-type BJTs, all p-type BJTs, all positive channel (p-channel) MOSFETs, etc.). In further examples, each of the first switch 126, the second switch 128, the third switch 130, the fourth switch 132, the fifth switch 134, or any combination thereof are implemented as one or more multiplexers.

In the example of FIG. 1, each of the first inverter 127, the second inverter 131, and the third inverter 135 is a device that inverts the logic value of the received at the input of the first inverter 127, the second inverter 131, and the third inverter 135, respectively, and outputs the inverted logic value at the output of the first inverter 127, the second inverter 131, and the third inverter 135, respectively. In the example of FIG. 1, each of the first inverter 127, the second inverter 131, and the third inverter 135 is a NOT logic gate. In additional examples, each of the first inverter 127, the second inverter 131, and the third inverter 135 may be a combination of one or more logic gates/logic circuits that invert the logic value of signals received and output the inverted logic value. In an analog implementation, each of the first inverter 127, the second inverter 131, and the third inverter 135 may be an inverting amplifier.

In the illustrated example of FIG. 1, in operation, the example comparator 118 configures the error amplifier 108 to be a voltage follower with the trimmed voltage signal $V_{TON}$ as an input. For example, the example comparator 118 configures the first switch 126, the second switch 128, the third switch 130, the fourth switch 132, and the fifth switch 134 to configure the error amplifier 108 to operate as a voltage follower. More specifically, the example comparator 118 opens the first switch 126, closes the second switch 128, opens the third switch 130, closes the fourth switch 132, and opens the fifth switch 134. By configuring one or more of the first switch 126, the second switch 128, the third switch 130, the fourth switch 132, or the fifth switch 134, the comparator 118 disables the error amplifier 108 from controlling the duration of each of the delay cells of the delay cells 110 based on the feedback voltage signal $V_{FB}$. Rather, by configuring one or more of the first switch 126, the second switch 128, the third switch 130, the fourth switch 132, or the fifth switch 134, the comparator 118 enables the error amplifier 108 to control the duration of each of the delay cells of the delay cells 110 based on the trimmed voltage signal $V_{TON}$. Additionally, the example feed forward voltage controller 116 sets the output of the delay cells 110 (e.g., the PWM signal on time) based on the first voltage signal $V_{SOFT}$ divided by the input voltage signal $V_{IN}$ and multiplied by the period of the oscillator 112. Additionally, by configuring one or more of the first switch 126, the second switch 128, the third switch 130, the fourth switch 132, or the fifth switch 134, the example comparator 118 disables the PWM signal of the delay cells 110 by disconnecting the oscillator 112 from the delay cells 110.

In the illustrated example of FIG. 1, in operation, the comparator 118 monitors the first voltage signal $V_{SOFT}$ to determine whether the first voltage signal $V_{SOFT}$ has initiated soft-start functionality. For example, the comparator 118 monitors the first voltage signal $V_{SOFT}$ and when the comparator 118 detects a positive change in voltage on the first voltage signal $V_{SOFT}$, the comparator 118 determines that the first voltage signal $V_{SOFT}$ has initiated soft-start functionality. When the example comparator 118 determines that the first voltage signal $V_{SOFT}$ has initiated soft-start functionality (e.g., the first voltage signal $V_{SOFT}$ begins to rise), the example comparator 118 monitors the feedback voltage signal $V_{FB}$ and the first voltage signal $V_{SOFT}$ to determine whether the first voltage signal $V_{SOFT}$ is within a threshold difference of the feedback voltage signal $V_{FB}$.

In the illustrated example of FIG. 1, in operation, when the example comparator 118 determines that the first voltage signal $V_{SOFT}$ is within a threshold difference of the feedback voltage signal $V_{FB}$, the example comparator 118 enables the error amplifier 108 to control the power stage 104 based on the feedback voltage signal $V_{FB}$ and the first voltage signal $V_{SOFT}$. For example, when the example comparator 118 determines that the first voltage signal $V_{SOFT}$ is within a threshold difference of the feedback voltage signal $V_{FB}$, the example comparator 118 configures one or more of the first switch 126, the second switch 128, the third switch 130, the fourth switch 132, or the fifth switch 134. More specifically, when the example comparator 118 determines that the first voltage signal $V_{SOFT}$ is within a threshold difference of the feedback voltage signal $V_{FB}$, the example comparator 118 closes the first switch 126, opens the second switch 128, closes the third switch 130, opens the fourth switch 132, and closes the fifth switch 134. By configuring one or more of the first switch 126, the second switch 128, the third switch 130, the fourth switch 132, or the fifth switch 134, the comparator 118 enables the error amplifier 108 to control the duration of each of the delay cells of the delay cells 110 based on to the feedback voltage signal $V_{FB}$ and the first voltage signal $V_{SOFT}$. Additionally, by configuring (e.g., opening and/or closing) one or more of the first switch 126, the second switch 128, the third switch 130, the fourth switch 132, and the fifth switch 134, the example comparator 118 enables the PWM signal of the delay cells 110.

Figure 2:
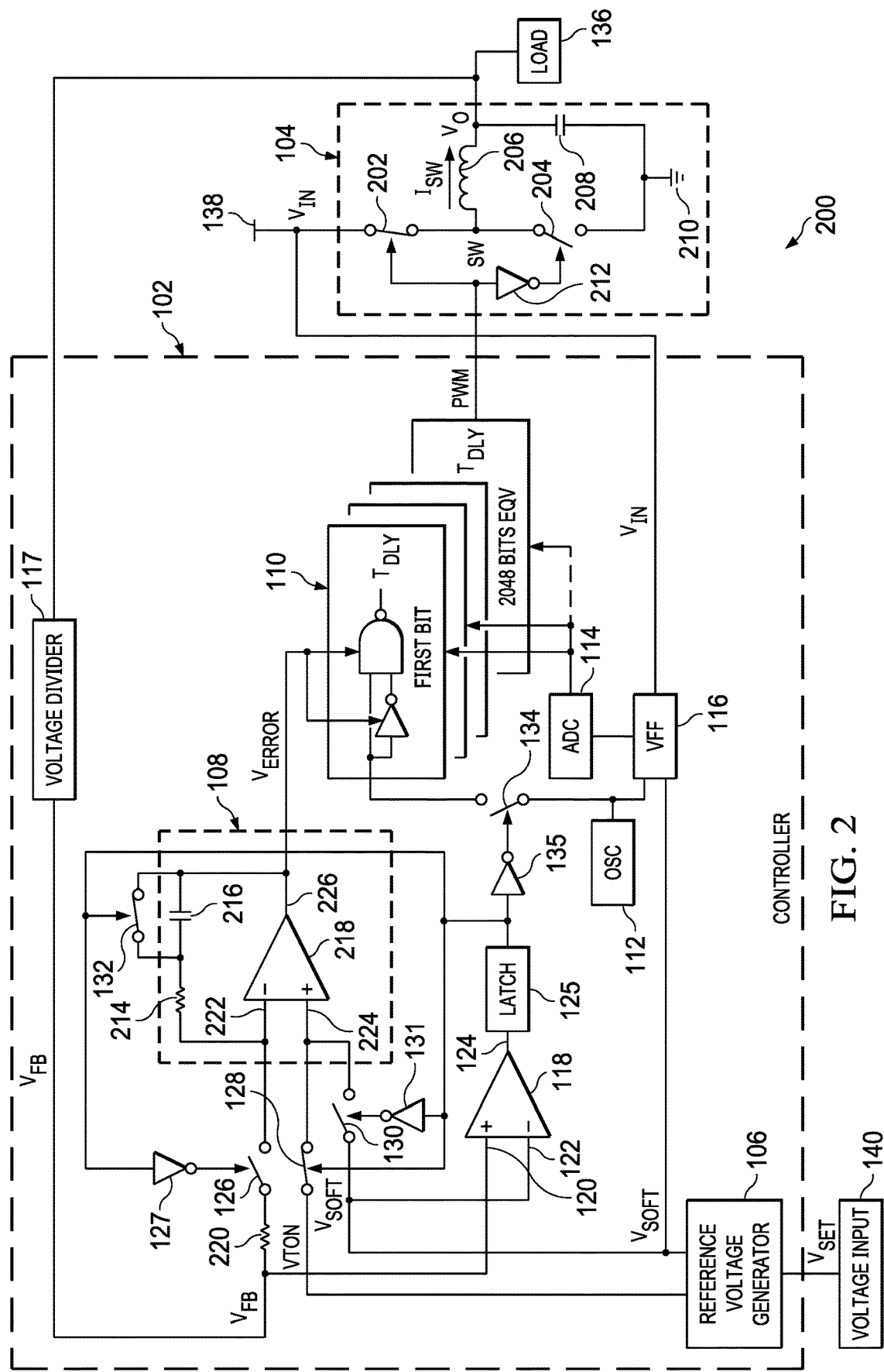
FIG. 2 is a schematic illustration of an example power converter system showing further detail of the controller of FIG. 1.

FIG. 2 is a schematic illustration of an example power converter system 200 showing further detail of the controller 102 of FIG. 1. The power converter system 200 includes the example controller 102, the example power stage 104, the example load 136, the example power supply 138, and the example voltage input 140. The example controller 102 includes the example reference voltage generator 106, the example error amplifier 108, the example delay cells 110, the example oscillator 112, the example ADC 114, the example feed forward voltage controller 116, the example voltage divider 117, the example comparator 118 including the example first input 120, the example second input 122, and the example output 124, the example latch 125, the example first switch 126, the example first inverter 127, the example second switch 128, the example third switch 130, the example second inverter 131, the example fourth switch 132, the example fifth switch 134, and an example third inverter 135.

In the illustrated example of FIG. 2, the example power stage 104 includes an example sixth switch 202, an example seventh switch 204, an example inductor 206, an example first capacitor 208, an example ground reference node 210, and an example inverter 212. The example error amplifier 108 includes an example first resistor 214, an example second capacitor 216, an example operational amplifier 218, and an example second resistor 220. The example operational amplifier 218 includes an inverting input 222, a non-inverting input 224, and an output 226. In the illustrated example of FIG. 2, each of the first switch 126, the second switch 128, the third switch 130, the fourth switch 132, the fifth switch 134, the sixth switch 202, and the seventh switch 204 includes a first terminal (e.g., a current terminal), a second terminal (e.g., a current terminal), and a third terminal (e.g., a control terminal).

In the illustrated example of FIG. 2, the example controller 102 is coupled to the example power stage 104. The example power stage 104 is coupled to the example controller 102, the example load 136, the example power supply 138, and the example voltage input 140.

In the illustrated example of FIG. 2, the second terminal of the example sixth switch 202 is coupled to the power supply 138, the first terminal of the example sixth switch 202 is coupled to a switch node SW, and the third terminal of the example sixth switch 202 is coupled to the delay cells 110. In the example illustrated in FIG. 2, the second terminal of the example seventh switch 204 is coupled to the switch node SW, the first terminal of the example seventh switch 204 is coupled to the ground reference node 210, and the third terminal of the example seventh switch 204 is coupled to inverter 212. The example inductor 206 is coupled between the switch node SW and an output voltage node $V_O$. The example first capacitor 208 is coupled between the example output voltage node $V_O$ and the ground reference node 210. In the example of FIG. 2, the ground reference node 210 is coupled to the first capacitor 208 and the first terminal of the seventh switch 204. The example inverter 212 is coupled to the third terminal of the seventh switch 204 and the delay cells 110.

In the illustrated example of FIG. 2, the example reference voltage generator 106 is coupled to the non-inverting input 224 of the operational amplifier 218 via the second switch 128 and the third switch 130, the second input 122 of the comparator 118, and the feed forward voltage controller 116. In the example of FIG. 2, the first resistor 214 is coupled in series to the second capacitor 216. Collectively, the first resistor 214 and the second capacitor 216 are coupled in parallel between the inverting input 222 and the output 226 of the operational amplifier 218 and form an operational amplifier feedback network. In the example of FIG. 2, the second capacitor 216 is coupled in parallel with the first terminal and second terminal of the fourth switch 132. In alternative examples, the first terminal and the second terminal of the fourth switch 132 are coupled in parallel with the first resistor 214 and the second capacitor 216. In the illustrated example, the inverting terminal 222 of the operational amplifier 218 is coupled to the second terminal of the first switch 126 and the first resistor 214. The example non-inverting terminal 224 of the operational amplifier 218 is coupled to the reference voltage generator 106 via the second switch 128 and the third switch 130. In the illustrated example, the second resistor 220 is coupled to the first terminal of the first switch 126 and the output voltage node $V_O$ of the power stage 104 via the voltage divider 117.

In the illustrated example of FIG. 2, the example delay cells 110 is coupled to the output 226 of the operational amplifier 218, the example oscillator 112 via the example fifth switch 134, the example ADC 114, the third terminal of the example sixth switch 202, and the inverter 212. The example oscillator 112 is coupled to the example delay cells 110 via the example fifth switch 134 and the example feed forward voltage controller 116. The example ADC 114 is coupled to the example delay cells 110 and the example feed forward voltage controller 116. The example feed forward voltage controller 116 is coupled to the example reference voltage generator 106, the example oscillator 112, the example ADC 114, and the example power supply 138. The example first input 120 of the comparator 118 is coupled to the output voltage node $V_O$ of the example power stage 104 via the voltage divider 117, the second input 122 of the example comparator 118 is coupled to the example reference voltage generator 106, and the output 124 of the comparator 118 is coupled to the example latch 125. The latch 125 is coupled to the third terminal of the example first switch 126 via the first inverter 127, the third terminal of the example second switch 128, the third terminal of the example third switch 130 via the second inverter 131, the third terminal of the example fourth switch 132, and the third terminal of the example fifth switch 134 via the third inverter 135.

In the illustrated example of FIG. 2, the first terminal of the example first switch 126 is coupled to the output voltage node $V_O$ of the example power stage 104 via the second resistor 220 and the voltage divider 117. The second terminal of the example first switch 126 is coupled to the inverting terminal 222 of the operational amplifier 218. The third terminal of the example first switch 126 is coupled to the output 124 of the example comparator 118 via the latch 125 and the first inverter 127. In the illustrated example, the first terminal of the example second switch 128 is coupled to the example reference voltage generator 106, the second terminal of the example second switch 128 is coupled to the non-inverting terminal 224 of the example operational amplifier 218. The third terminal of the example second switch 128 is coupled to the output 124 of the example comparator 118 via the latch 125. In the illustrated example, the first terminal of the example third switch 130 is coupled to the example reference voltage generator 106, the second terminal of the example third switch 130 is coupled to the non-inverting terminal 224 of the example operational amplifier 218. The third terminal of the example third switch 130 is coupled to the output 124 of the example comparator 118 via the latch 125 and the second inverter 131. In the illustrated example, the first terminal and the second terminal of the example fourth switch 132 are coupled to the second capacitor 216 such that the fourth switch 132 is coupled in parallel to the second capacitor 216. The third terminal of the example fourth switch 132 is coupled to the output 124 of the example comparator 118 via the latch 125. In other examples, the first terminal and the second terminal of the example fourth switch 132 are coupled to the first resistor 214 and the second capacitor 216 such that the fourth switch 132 is coupled in parallel to the first resistor 214 and the second capacitor 216. In the illustrated example, the first terminal of the example fifth switch 134 is coupled to the example oscillator 112, the second terminal of the example fifth switch 134 is coupled to the example delay cells 110. The third terminal of the example fifth switch 134 is coupled to the output 124 of the example comparator 118 via the latch 125 and the third inverter 135.

In the illustrated example of FIG. 2, the power stage 104 is a DC-DC buck converter. DC power converters function by temporarily storing input energy in electronic components (e.g. inductors, capacitors, inductive elements, capacitive elements, etc.) and then releasing that energy at the load 136 at a different voltage. In the power stage 104, the inverter 212 is a NOT gate. The example inverter 212 ensures that when the sixth switch 202 is closed, the seventh switch 204 is open, and that when the seventh switch 204 is closed, the sixth switch 202 is enabled. In other examples, the inverter 212 may be a combination of logic circuits that ensures that the sixth switch 202 and the seventh switch 204 are not closed at the same time.

In the illustrated example of FIG. 2, when the sixth switch 202 is closed and the seventh switch 204 is open, current flows from the power supply 138 (e.g., the input voltage signal $V_{IN}$) to the inductor 206 which charges at linear rate. When the inductor 206 is charging, the inductor 206 is storing energy in a magnetic field produced by the a current $I_{SW}$ flowing through the inductor 206. Additionally, when the sixth switch 202 is closed and the seventh switch 204 is open, the first capacitor 208 also charges to the desired output voltage level and the load 136 is supplied with current from the power supply 138. When the sixth switch 202 is open, the seventh switch 204 is closed so that the current $I_{SW}$ can continue to flow to the load 136. The energy that is stored in the magnetic field of the inductor 206 dissipates and as it does so, generates a current (e.g., $I_{SW}$) that flows through the power stage 104 and to the load 136. When the sixth switch 202 is open, the currents $I_{SW}$ flowing through the power stage 104 will be equal in magnitude to the current flowing though the seventh switch 204. The current from the inductor 206 flows to the first capacitor 208 and the load 136, while the first capacitor 208 maintains the desired output voltage at the output voltage node $V_O$ of the power stage 104 and the load 136 receives the power. The current $I_{SW}$ returns to the inductor 206 by flowing through the ground reference node 210 and the seventh switch 204. The switching pattern noted above allows for continuous current to flow into the load 136.

In the example illustrated in FIG. 2, the load 136 is a sub-circuit of a microcontroller. In other examples, the load 136 may be an LED array in an EV, a motor, a server, industrial and/or residential appliances, a datacom server, or any suitable load.

In the illustrated example of FIG. 2, the example power supply 138 is an unregulated linear power supply. For example, the power supply 138 is the output of diode rectifier. In other examples, other power supplies may be used that are suitable to the application. The example power supply 138 generates the input voltage signal $V_{IN}$.

In the example illustrated in FIG. 2, the reference voltage generator 106 is a combination of one or more voltage regulators, amplifiers, comparators, and other logic that regulates one or more voltage levels in the controller 102. For example, the reference voltage generator 106 generates a first voltage signal $V_{SOFT}$ at a first voltage level. For example, the first voltage signal $V_{SOFT}$ is at a reference voltage level corresponding to soft startup of the power stage 104 such that the power stage 104 ramps up to a desired and/or predetermined voltage level (e.g., a voltage level corresponding to the voltage level of the $V_{SET}$ signal). Additionally, the example reference voltage generator 106 generates the trimmed voltage signal $V_{TON}$ (e.g., at the second voltage level) to serve as a reference voltage level for the operational amplifier 218. In examples disclosed herein, the trimmed voltage signal $V_{TON}$ generated by the reference voltage generator 106 is temperature compensated (e.g., altered and/or otherwise changes in response to a change in external temperature and/or the temperature of a silicon die). For example, as the temperature of the delay cells 110 increases and/or decreases from a previous, the trimmed voltage signal $V_{TON}$ generated by the reference voltage generator 106 changes accordingly to ensure proper operation throughout all temperatures. For example, the trimmed voltage signal $V_{TON}$ generated by the reference voltage generator 106 corresponds to a desired duration (e.g., 1.2 nanoseconds) for each of the delay cells 110. Moreover, the trimmed voltage signal $V_{TON}$ generated by the example reference voltage generator 106 changes across different temperatures to maintain the desired duration for each of the delay cells 110. For example, when the temperature of the delay cells 110 increases, the trimmed voltage signal $V_{TON}$ generated by the reference voltage generator 106 decreases to maintain a desired duration of the delay cells 110. In the alternative, when the temperature of the example delay cells 110 decreases, the trimmed voltage signal $V_{TON}$ generated by the reference voltage generator 106 increases to maintain a desired duration on the delay cells 110. In additional or alternative examples, the trimmed voltage signal $V_{TON}$ generated by the reference voltage generator 106 increases to compensate an increase of the temperature of the delay cells 110 and decreases to compensate a decrease of the temperature of the delay cells 110.

In the example illustrated in FIG. 2, the example error amplifier 108 includes the first resistor 214, the second capacitor 216, the operational amplifier 218, and the second resistor 220. Collectively, the first resistor 214, the second capacitor 216, the operational amplifier 218, and the second resistor 220 generate a control signal $V_{ERROR}$ at the output 226 based on one or more inputs from the example power stage 104 and the reference voltage generator 106. The error amplifier 108 monitors the output voltage level at the output voltage node $V_O$ of the power stage 104 via the voltage divider 117 as the feedback voltage signal $V_{FB}$. In the example of FIG. 2, the first resistor 214, the second capacitor 216, and the second resistor 220 are an operational amplifier feedback network that sets a gain of the error amplifier 108 such that the error amplifier 108 can control the power stage 104 to generate a desired output voltage level (e.g., corresponding to the voltage level of the $V_{SET}$ signal) at the output voltage node $V_O$ of the power stage 104. During steady state operation, if the output voltage signal at the output voltage node $V_O$ of the power stage 104 deviates away from the desired level (e.g., if the feedback voltage signal $V_{FB}$ increases and/or decreases above normal operating levels during transients), the operational amplifier feedback network (e.g., the first resistor 214, the second capacitor 216, and the second resistor 220) causes the operational amplifier 218 to generate the control signal $V_{ERROR}$ at the output 226 to adjust the duration of the delay of each of the delay cells included in the delay cells 110.

In the illustrated example of FIG. 2, the example delay cells 110 includes a plurality of example delay cells to generate a PWM signal. In examples disclosed herein, the delay cells 110 generate the PWM signal by introducing a delay to an example oscillator signal based on one or more of the input voltage signal $V_{IN}$, the signal generated by the oscillator 112, and the first voltage signal $V_{SOFT}$ (e.g., more generally, the output of the ADC 114). The delay cells 110 are used to adjust the duty cycle of the PWM signal to the power stage 104 to provide power to an example load 136. For example, the output of the ADC 114 determines a number of delay cells 110 that are selected (e.g., enabled). The duty cycle of the PWM signal corresponds to the number of the delay cells 110 that are enabled, multiplied by the duration of each of the delay cells 110. In the example of FIG. 2, the duration of each delay cell of the delay cells 110 is determined based on the control signal generated by the error amplifier 108. For example, a higher voltage level on the control signal corresponds to a longer duration of each of the delay cells 110 and a lower voltage level on the control signal corresponds to a shorter duration of each of the delay cells 110.

In the illustrated example of FIG. 2, the oscillator 112 is a phase lock looped oscillator. In other examples, the oscillator 112 is a capacitor (RC) oscillator, a ring oscillator, a crystal oscillator, or any other suitable oscillator for the application. The example oscillator 112 produces an oscillating signal. In FIG. 2, the oscillating signal may be a periodic and/or aperiodic signal generated to initiate the generation of the PWM signal and/or otherwise set the frequency at which the delay cells 110 operates. For example, when the oscillator 112 outputs the oscillating signal, the delay cells 110 generate a corresponding rising edge on the PWM signal when the oscillating signal is at a falling edge. In such an example, the PWM signal is maintained at a logic high value for the duration of delay associated with number of the delay cells 110 active. The number of the delay cells 110 active is indicated by the example ADC 114.

In the illustrated example of FIG. 2, the example ADC 114 is a current analog to digital converter. The ADC 114 converts an analog current level to a digital output (e.g., a binary count value). For example, the example ADC 114 converts the analog current level to an eight-bit binary signal to indicate the number of the delay cells 110 to be active. In other examples disclosed herein, the ADC 114 may be any other suitable decoder that indicates the number of the delay cells 110 to be active.

In the example illustrated in FIG. 2, the example feed forward voltage controller 116 is an analog multiplier. The example feed forward voltage controller 116 produces an analog current signal for use by the ADC 114. For example, the feed forward voltage controller 116 produces the analog current signal based on one or more of the first voltage signal $V_{SOFT}$, the input voltage signal $V_{IN}$, the frequency of the oscillator signal generated by the oscillator 112, and one or more constants corresponding to scaling factors. The scaling factors are suited to the design of the controller 102. For example, the scaling factors are related to the duration of each of the delay cells 110. The example feed forward voltage controller 116 sets the number of the delay cells 110 to be active via the ADC 114. In this manner, the example feed forward voltage controller 116, via the ADC 114, sets the delay (e.g., the duration) of the pulse width of the PWM signal generated by the delay cells 110 by setting the number of the delay cells 110 to be active. In this manner, the delay cells 110 generate the PWM signal by introducing a delay to the example oscillator signal that is based on the output of the feed forward voltage controller 116 (e.g., based on the input voltage $V_{IN}$, the signal generated by the oscillator 112, and the first voltage signal $V_{SOFT}$).

In the example of FIG. 2, the example voltage divider 117 is a resistive divider network that allows the voltage level at the output voltage node $V_O$ to be measured and/or otherwise monitored by the operational amplifier 218 and/or more generally, the error amplifier 108 without a possibility of damaging the operational amplifier 218 and/or more generally, the error amplifier 108.

In the illustrated example of FIG. 2, the comparator 118 is an analog comparator including the first input 120, the second input 122, and the output 124. In the example of FIG. 2, the comparator 118 compares the feedback voltage signal $V_{FB}$ received at the first input 120 and the first voltage signal $V_{SOFT}$ received at the second input 122 and determines whether the magnitude of the first voltage signal $V_{SOFT}$ is within a threshold value of the feedback voltage signal $V_{FB}$. For example, the threshold voltage corresponds to an acceptable difference between the magnitude of the first voltage signal $V_{SOFT}$ and the magnitude of the feedback voltage signal $V_{FB}$ based on the application. The example comparator 118 also configures one or more of the first switch 126, the second switch 128, the third switch 130, the fourth switch 132, or the fifth switch 134 based on the comparison of the first voltage signal $V_{SOFT}$ and the feedback voltage signal $V_{FB}$ via a control signal generated at the output 124. In the example of FIG. 2, the example comparator 118 configures one or more of the first switch 126, the second switch 128, the third switch 130, the fourth switch 132, or the fifth switch 134 at the start of operation of the controller 102 via the control signal generated at the output 124.

In the example of FIG. 2, the latch 125 is a device that maintains a logic value at the output of the latch 125 corresponding to the logic value received at the input of the latch 125. For example, the latch 125 is an SR latch. In other examples, the latch 125 is a D-flip-flop, a JK latch, a gated SR latch, a gated JK latch, a gated D-flip-flop, an Earle latch, or any other suitable latch.

In the illustrated example of FIG. 2, each of the first switch 126, the second switch 128, the third switch 130, the fourth switch 132, the fifth switch 134, the sixth switch 202, and the seventh switch 204 can be implemented by a transistor. For example, each of the first switch 126, the second switch 128, the third switch 130, the fourth switch 132, the fifth switch 134, and the sixth switch 202 is an n-channel MOSFET. In the example of FIG. 2, the seventh switch 204 is a p-channel MOSFET. In other examples, the first switch 126, the second switch 128, the third switch 130, the fourth switch 132, the fifth switch 134, the sixth switch 202, and the seventh switch 204 are BJTs, JFETs, HBTs, any suitable transistor for the application, and/or any combination thereof. Although many combinations of BJTs, JFETs, HBTs, or any suitable transistors may be used to implement one or more of the first switch 126, the second switch 128, the third switch 130, the fourth switch 132, or the fifth switch 134, it may desirable in a particular controller to implement each of the first switch 126, the second switch 128, the third switch 130, the fourth switch 132, and the fifth switch 134 with the same switch type (e.g., all n-type BJTs, all p-type BJTs, all p-channel MOSFETs, etc.). In further examples, each of the first switch 126, the second switch 128, the third switch 130, the fourth switch 132, the fifth switch 134, or any combination thereof are implemented as one or more multiplexers.

In the example of FIG. 2, each of the first inverter 127, the second inverter 131, and the third inverter 135 is a device that inverts the logic value of the received at the input of the first inverter 127, the second inverter 131, and the third inverter 135, respectively, and outputs the inverted logic value at the output of the first inverter 127, the second inverter 131, and the third inverter 135, respectively. In the example of FIG. 2, each of the first inverter 127, the second inverter 131, and the third inverter 135 is a NOT logic gate. In additional examples, each of the first inverter 127, the second inverter 131, and the third inverter 135 may be a combination of one or more logic gates/logic circuits that invert the logic value of signals received and output the inverted logic value. In an analog implementation, each of the first inverter 127, the second inverter 131, and the third inverter 135 may be an inverting amplifier.

In the illustrated example of FIG. 2, in operation, the example comparator 118 configures the error amplifier 108 to be a voltage follower with the trimmed voltage signal $V_{TON}$ as an input to the non-inverting input 224. For example, the example comparator 118 configures the first switch 126, the second switch 128, the third switch 130, the fourth switch 132, and the fifth switch 134 to configure the error amplifier 108 to operate as a voltage follower. More specifically, the example comparator 118 opens the first switch 126, closes the second switch 128, opens the third switch 130, closes the fourth switch 132, and opens the fifth switch 134. By configuring one or more of the first switch 126, the second switch 128, the third switch 130, the fourth switch 132, or the fifth switch 134, the comparator 118 disables the error amplifier 108 from controlling the duration of each of the delay cells of the delay cells 110 based on the feedback voltage signal $V_{FB}$. Rather, by configuring one or more of the first switch 126, the second switch 128, the third switch 130, the fourth switch 132, or the fifth switch 134, the comparator 118 enables the error amplifier 108 to control the duration of each of the delay cells of the delay cells 110 based on the trimmed voltage signal $V_{TON}$. Additionally, the example feed forward voltage controller 116 sets the output of the delay cells 110 (e.g., the PWM signal on time) based on the first voltage signal $V_{SOFT}$ divided by the input voltage signal $V_{IN}$ and multiplied by the period of the oscillator 112. Additionally, by configuring one or more of the first switch 126, the second switch 128, the third switch 130, the fourth switch 132, or the fifth switch 134, the example comparator 118 disables the PWM signal of the delay cells 110 by disconnecting the oscillator 112 from the delay cells 110.

In the illustrated example of FIG. 2, in operation, the comparator 118 monitors the first voltage signal $V_{SOFT}$ to determine whether the first voltage signal $V_{SOFT}$ has initiated soft-start functionality. For example, the comparator 118 monitors the first voltage signal $V_{SOFT}$ and when the comparator 118 detects a positive change in voltage on the first voltage signal $V_{SOFT}$, the comparator 118 determines that the first voltage signal $V_{SOFT}$ has initiated soft-start functionality. When the example comparator 118 determines that the first voltage signal $V_{SOFT}$ has initiated soft-start functionality (e.g., the first voltage signal $V_{SOFT}$ begins to rise), the example comparator 118 monitors the feedback voltage signal $V_{FB}$ and the first voltage signal $V_{SOFT}$ to determine whether the first voltage signal $V_{SOFT}$ is within a threshold difference of the feedback voltage signal $V_{FB}$.

In the illustrated example of FIG. 2, in operation, when the example comparator 118 determines that the first voltage signal $V_{SOFT}$ is within a threshold difference of the feedback voltage signal $V_{FB}$, the example comparator 118 enables the error amplifier 108 to control the power stage 104 based on the feedback voltage signal $V_{FB}$ and the first voltage signal $V_{SOFT}$. For example, when the example comparator 118 determines that the first voltage signal $V_{SOFT}$ is within a threshold difference of the feedback voltage signal $V_{FB}$, the example comparator 118 configures one or more of the first switch 126, the second switch 128, the third switch 130, the fourth switch 132, or the fifth switch 134. More specifically, when the example comparator 118 determines that the first voltage signal $V_{SOFT}$ is within a threshold difference of the feedback voltage signal $V_{FB}$, the example comparator 118 closes the first switch 126, opens the second switch 128, closes the third switch 130, opens the fourth switch 132, and closes the fifth switch 134. By configuring one or more of the first switch 126, the second switch 128, the third switch 130, the fourth switch 132, or the fifth switch 134, the comparator 118 enables the error amplifier 108 to control the duration of each of the delay cells of the delay cells 110 based on the feedback voltage signal $V_{FB}$ and the first voltage signal $V_{SOFT}$. Additionally, by configuring (e.g., opening and/or closing) one or more of the first switch 126, the second switch 128, the third switch 130, the fourth switch 132, and the fifth switch 134, the example comparator 118 enables the PWM signal of the delay cells 110.

Figure 3:
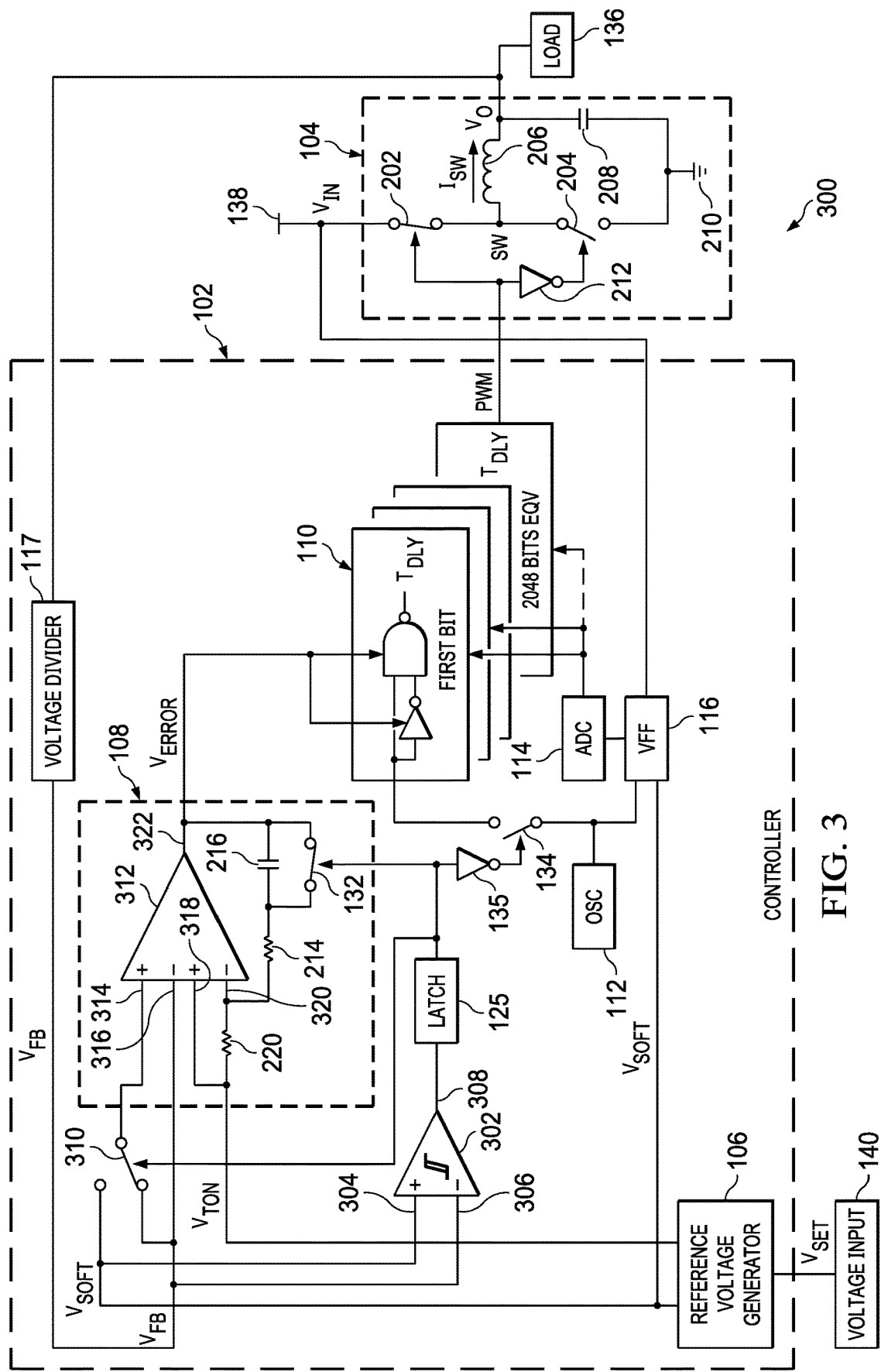
FIG. 3 is a schematic illustration of an example power converter system showing alternative detail of the controller of FIG. 1.

FIG. 3 is a schematic illustration of an example power converter system 300 showing alternative detail of the controller 102 of FIG. 1. The power converter system 300 includes the example controller 102, the example power stage 104, the example load 136, the example power supply 138, and the example voltage input 140. The example controller 102 includes the example reference voltage generator 106, the example error amplifier 108, the example delay cells 110, the example oscillator 112, the example ADC 114, the example feed forward voltage controller 116, the example voltage divider 117, an example trigger 302, the example latch 125, the example fourth switch 132, the example fifth switch 134, the example third inverter 133, and an example eighth switch 310. The example trigger 302 includes an example first 304, an example second input 306, and an example output 308.

In the illustrated example of FIG. 3, the example power stage 104 includes the example sixth switch 202, the example seventh switch 204, the example inductor 206, the example first capacitor 208, the example ground reference node 210, and the example inverter 212. The example error amplifier 108 includes the example first resistor 214, the example second capacitor 216, an example differential difference amplifier 312, and the example second resistor 220. The example differential difference amplifier 312 includes a first non-inverting input 314, a first inverting input 316, a second non-inverting input 318, a second inverting input 320, and an output 322. In the illustrated example of FIG. 3, the fourth switch 132, the fifth switch 134, the sixth switch 202, and the seventh switch 204 includes a first terminal (e.g., a current terminal), a second terminal (e.g., a current terminal), and a third terminal (e.g., a control terminal). In the example of FIG. 3, the eighth switch 310 includes a first terminal (e.g., a current terminal), a second terminal (e.g., a current terminal), a third terminal (e.g., a current terminal), and a fourth terminal (e.g., a control terminal).

In the illustrated example of FIG. 3, the example controller 102 is coupled to the example power stage 104. The example power stage 104 is coupled to the example controller 102, the example load 136, the example power supply 138, and the example voltage input 140.

In the illustrated example of FIG. 3, the second terminal of the example sixth switch 202 is coupled to the power supply 138, the first terminal of the example sixth switch 202 is coupled to the switch node SW, and the third terminal of the example sixth switch 202 is coupled to the delay cells 110. In the example of FIG. 3, the second terminal of the example seventh switch 204 is coupled to the switch node SW, the first terminal of the example seventh switch 204 is coupled to the ground reference node 210, and the third terminal of the example seventh switch 204 is coupled to inverter 212. The example inductor 206 is coupled between the switch node SW and an output voltage node $V_O$. The example first capacitor 208 is coupled between the example output voltage node $V_O$ and the ground reference node 210. The ground reference node 210 is coupled to the first capacitor 208 and the first terminal of the seventh switch 204. The example inverter 212 is coupled to the third terminal of the seventh switch 204 and the delay cells 110.

In the illustrated example of FIG. 3, the example reference voltage generator 106 is coupled to the first non-inverting input 314 of the differential difference amplifier 312 via the eighth switch 310, the second non-inverting input 318 of the differential difference amplifier 312, the second inverting input 316 of the differential difference amplifier 312 via the second resistor 220, the first input 304 of the trigger 302, the feed forward voltage controller 116, and the power stage 104. In the example of FIG. 3, the first resistor 214 is coupled in series to the second capacitor 216. Collectively, the first resistor 214 and the second capacitor 216 are coupled in parallel between the second inverting input 320 and the output 322 of the differential difference amplifier 312 and form a differential difference amplifier feedback network. In the example of FIG. 3, the second capacitor 216 is coupled in parallel with the first terminal and second terminal of the fourth switch 132. In alternative examples, the first terminal and the second terminal of the fourth switch 132 are coupled in parallel with the first resistor 214 and the second capacitor 216. In the illustrated example, the first non-inverting terminal 314 of the differential difference amplifier 312 is coupled to the third terminal of the eighth switch 310. In the example of FIG. 3, the first inverting input 316 of the differential difference amplifier 312 is coupled to the output voltage node $V_O$ of the power stage 104 via the voltage divider 117. In the example illustrated in FIG. 3, the second non-inverting input 318 of the differential difference amplifier 312 is coupled to the reference voltage generator 106. In the example of FIG. 3, the second inverting input 320 of the differential difference amplifier 312 is coupled to the reference voltage generator 106 via the second resistor 220. In the illustrated example, the second resistor 220 is coupled to the reference voltage generator 106 and the second inverting input 320 of the differential difference amplifier 312.

In the illustrated example of FIG. 3, the example delay cells 110 is coupled to the output 322 of the differential difference amplifier 312, the example oscillator 112 via the example fifth switch 134, the example ADC 114, the third terminal of the example sixth switch 202, and the inverter 212. The example oscillator 112 is coupled to the example delay cells 110 via the example fifth switch 134 and the example feed forward voltage controller 116. The example ADC 114 is coupled to the example delay cells 110 and the example feed forward voltage controller 116. The example feed forward voltage controller 116 is coupled to the example reference voltage generator 106, the example oscillator 112, the example ADC 114, and the example power supply 138. The example first input 304 of the trigger 302 is coupled to the reference voltage generator 106 (e.g., the first voltage signal $V_{SOFT}$), the second input 306 of the example trigger 302 is coupled to the output voltage node $V_O$ of the power stage 104, and the output 308 of the trigger 302 is coupled to the example latch 125. The latch 125 is coupled to the third terminal of the example fourth switch 132, the third terminal of the example fifth switch 134 via the third inverter 135, and the fourth terminal of the example eighth switch 310.

In the illustrated example of FIG. 3, the first terminal and the second terminal of the example fourth switch 132 are coupled to the second capacitor 216 such that the fourth switch 132 is coupled in parallel to the second capacitor 216. The third terminal of the example fourth switch 132 is coupled to the output 308 of the example trigger 302 via the latch 125 and the third inverter 135. In other examples, the first terminal and the second terminal of the example fourth switch 132 are coupled to the first resistor 214 and the second capacitor 216 such that the fourth switch 132 is coupled in parallel to the first resistor 214 and the second capacitor 216. In the illustrated example, the first terminal of the example fifth switch 134 is coupled to the example oscillator 112, the second terminal of the example fifth switch 134 is coupled to the example delay cells 110. The third terminal of the example fifth switch 134 is coupled to the output 308 of the example trigger 302 via the latch 125. In the example of FIG. 3, the first terminal of the eighth switch 310 is coupled to the reference voltage generator 106 and received the first voltage signal $V_{SOFT}$, the second terminal of the eighth switch 310 is coupled to the output voltage node $V_O$ of the power stage 104 and received the feedback voltage signal $V_{FB}$, the third terminal of the eighth switch 310 is coupled to the first non-inverting input of the differential difference amplifier 312, the fourth terminal of the eighth switch 310 is coupled to the output of the trigger 302.

In the illustrated example of FIG. 3, the power stage 104 is a DC-DC buck converter. DC power converters function by temporarily storing input energy in electronic components (e.g. inductors, capacitors, inductive elements, capacitive elements, etc.) and then releasing that energy at the load 136 at a different voltage. In the power stage 104, the inverter 212 is a NOT gate. The example inverter 212 ensures that when the sixth switch 202 is closed, the seventh switch 204 is open, and that when the seventh switch 204 is closed, the sixth switch 202 is open. In other examples, the inverter 212 may be a combination of logic circuits that ensures that the sixth switch 202 and the seventh switch 204 are not closed at the same time.

In the illustrated example of FIG. 3, when the sixth switch 202 is closed and the seventh switch 204 is open, current flows from the power supply 138 (e.g., the input voltage signal $V_{IN}$) to the inductor 206 which charges at linear rate. When the inductor 206 is charging, the inductor 206 is storing energy in a magnetic field produced by the a current $I_{SW}$ flowing through the inductor 206. Additionally, when the sixth switch 202 is closed and the seventh switch 204 is open, the first capacitor 208 also charges to the desired output voltage level and the load 136 is supplied with current from the power supply 138. When the sixth switch 202 is open, the seventh switch 204 is closed so that the current $I_{SW}$ can continue to flow to the load 136. The energy that is stored in the magnetic field of the inductor 206 dissipates and as it does so, generates a current (e.g., $I_{SW}$) that flows through the power stage 104 and to the load 136. When the sixth switch 202 is open, the currents $I_{SW}$ flowing through the power stage 104 will be equal in magnitude to the current flowing though the seventh switch 204. The current from the inductor 206 flows to the first capacitor 208 and the load 136, while the first capacitor 208 maintains the desired output voltage at the output voltage node $V_O$ of the power stage 104 and the load 136 receives the power. The current $I_{SW}$ returns to the inductor 206 by flowing through the ground reference node 210 and the seventh switch 204. The switching pattern noted above allows for continuous current to flow into the load 136.

In the example illustrated in FIG. 3, the load 136 is a sub-circuit of a microcontroller. In other examples, the load 136 may be an LED array in an EV, a motor, a server, industrial and/or residential appliances, a datacom server, or any suitable load.

In the illustrated example of FIG. 3, the example power supply 138 is an unregulated linear power supply. For example, the power supply 138 is the output of diode rectifier. In other examples, other power supplies may be used that are suitable to the application. The example power supply 138 generates the input voltage signal $V_{IN}$.

In the example illustrated in FIG. 3, the reference voltage generator 106 is a combination of one or more voltage regulators, amplifiers, comparators, and other logic that regulates one or more voltage levels in the controller 102. For example, the reference voltage generator 106 generates a first voltage signal $V_{SOFT}$ at a first voltage level. For example, the first voltage signal $V_{SOFT}$ is at a reference voltage level corresponding to soft startup of the power stage 104 such that the power stage 104 ramps up to a desired and/or predetermined voltage level (e.g., a voltage level corresponding to the voltage level of the $V_{SET}$ signal. Additionally, the example reference voltage generator 106 generates the trimmed voltage signal $V_{TON}$ (e.g., at the second voltage level) to serve as a reference voltage level for the differential difference amplifier 312. In examples disclosed herein, the trimmed voltage signal $V_{TON}$ generated by the reference voltage generator 106 is temperature compensated (e.g., altered and/or otherwise changes in response to a change in external temperature and/or the temperature of a silicon die). For example, as the temperature of the delay cells 110 increases and/or decreases from a previous, the trimmed voltage signal $V_{TON}$ generated by the reference voltage generator 106 changes accordingly to ensure proper operation throughout all temperatures. For example, the trimmed voltage signal $V_{TON}$ generated by the reference voltage generator 106 corresponds to a desired duration (e.g., 1.2 nanoseconds) for each of the delay cells 110. Moreover, the trimmed voltage signal $V_{TON}$ generated by the example reference voltage generator 106 changes across different temperatures to maintain the desired duration for each of the delay cells 110. For example, when the temperature of the delay cells 110 increases, the trimmed voltage signal $V_{TON}$ generated by the reference voltage generator 106 decreases to maintain a desired duration of the delay cells 110. In the alternative, when the temperature of the example delay cells 110 decreases, the trimmed voltage signal $V_{TON}$ generated by the reference voltage generator 106 increases to maintain a desired duration on the delay cells 110. In additional or alternative examples, the trimmed voltage signal $V_{TON}$ generated by the reference voltage generator 106 increases to compensate an increase of the temperature of the delay cells 110 and decreases to compensate a decrease of the temperature of the delay cells 110.

In the example illustrated in FIG. 3, the example error amplifier 108 includes the first resistor 214, the second capacitor 216, the differential difference amplifier 312, and the second resistor 220. Collectively, the first resistor 214, the second capacitor 216, the differential difference amplifier 312, and the second resistor 220 generate a control signal $V_{ERROR}$ at the output 322 based on one or more inputs from the example power stage 104 and the reference voltage generator 106. The error amplifier 108 monitors the output voltage level at the output voltage node $V_O$ of the power stage 104 via the voltage divider 117 as the feedback voltage signal $V_{FB}$. In the examples, the first resistor 214, the second capacitor 216, and the second resistor 220 are a differential difference amplifier feedback network that sets a gain of the error amplifier 108 such that the error amplifier 108 can control the power stage 104 to generate a desired output voltage level (e.g., corresponding to the voltage level of the $V_{SET}$ signal) at the output voltage node $V_O$ of the power stage 104. During steady state operation, if the output voltage signal at the output voltage node $V_O$ of the power stage 104 deviates away from the desired level (e.g., if the feedback voltage signal $V_{FB}$ increases and/or decreases above normal operating levels during transients), the differential difference amplifier feedback network (e.g., the first resistor 214, the second capacitor 216, and the second resistor 220) causes the differential difference amplifier 312 to generate the control signal $V_{ERROR}$ at the output 322 to adjust the duration of the delay of each of the delay cells included in the delay cells 110. For example, the differential difference amplifier 312 determines the difference between the voltage level at the first non-inverting input 314 and the voltage level at the first inverting input 316. After determining the difference between the voltage level at the first non-inverting input 314 and the voltage level at the first inverting input 316, the differential difference amplifier 312 multiplies the gain of the differential difference amplifier feedback network (e.g., the gain of the feedback network coupled between the second non-inverting input 318, the second inverting input 320, and the output 322) by the difference between voltage level at the first non-inverting input 314 and the voltage level at the first inverting input 316.

In the illustrated example of FIG. 3, the example delay cells 110 includes a plurality of example delay cells to generate a PWM signal. In examples disclosed herein, the delay cells 110 generate the PWM signal by introducing a delay to an example oscillator signal based on one or more of the input voltage signal $V_{IN}$, the signal generated by the oscillator 112, and the first voltage signal $V_{SOFT}$ (e.g., more generally, the output of the ADC 114). The delay cells 110 are used to adjust the duty cycle of the PWM signal to the power stage 104 to provide power to an example load 136. For example, the output of the ADC 114 determines a number of the delay cells 110 that are selected (e.g., enabled). The duty cycle of the PWM signal corresponds to the number of the delay cells 110 that are enabled, multiplied by the duration of each of the delay cells 110. In the example of FIG. 3, the duration of each delay cell of the delay cells 110 is determined based on the control signal generated by the error amplifier 108. For example, a higher voltage level on the control signal corresponds to a longer duration of each of the delay cells 110 and a lower voltage level on the control signal corresponds to a shorter duration of each of the delay cells 110.

In the illustrated example of FIG. 3, the oscillator 112 is a phase lock looped oscillator. In other examples, the oscillator 112 is a capacitor (RC) oscillator, a ring oscillator, a crystal oscillator, or any other suitable oscillator for the application. The example oscillator 112 produces an oscillating signal. In FIG. 3, the oscillating signal may be a periodic and/or aperiodic signal generated to initiate the generation of the PWM signal and/or otherwise set the frequency at which the delay cells 110 operates. For example, when the oscillator 112 outputs the oscillating signal, the delay cells 110 generate a corresponding rising edge on the PWM signal when the oscillating signal is at a falling edge. In such an example, the PWM signal is maintained at a logic high value for the duration of delay associated with number of the delay cells 110 active. The number of the delay cells 110 active is indicated by the example ADC 114.

In the illustrated example of FIG. 3, the example ADC 114 is a current analog to digital converter. The ADC 114 converts an analog current level to a digital output (e.g., a binary count value). For example, the example ADC 114 converts the analog current level to an eight-bit binary signal to indicate the number of the delay cells 110 to be active. In other examples disclosed herein, the ADC 114 may be any other suitable decoder that indicates the number of the delay cells 110 to be active.

In the example illustrated in FIG. 3, the example feed forward voltage controller 116 is an analog multiplier. The example feed forward voltage controller 116 produces an analog current signal for use by the ADC 114. For example, the feed forward voltage controller 116 produces the analog current signal based on one or more of the first voltage signal $V_{SOFT}$, the input voltage signal $V_{IN}$, the frequency of the oscillator signal generated by the oscillator 112, and one or more constants corresponding to scaling factors. The scaling factors are suited to the design of the controller 102. For example, the scaling factors are related to the duration of each of the delay cells 110. The example feed forward voltage controller 116 sets the number of the delay cells 110 to be active via the ADC 114. In this manner, the example feed forward voltage controller 116, via the ADC 114, sets the delay (e.g., the duration) of the pulse width of the PWM signal generated by the delay cells 110 by setting the number of the delay cells 110 to be active. In this manner, the delay cells 110 generate the PWM signal by introducing a delay to the example oscillator signal that is based on the output of the feed forward voltage controller 116 (e.g., based on the input voltage $V_{IN}$, the signal generated by the oscillator 112, and the first voltage signal $V_{SOFT}$).

In the example of FIG. 3, the example voltage divider 117 is a resistive divider network that allows the voltage level at the output voltage node $V_O$ to be measured and/or otherwise monitored by the differential difference amplifier 312 and/or more generally, the error amplifier 108 without a possibility of damaging the differential difference amplifier 312 and/or more generally, the error amplifier 108

In the illustrated example of FIG. 3, the trigger 302 is a Schmitt trigger including the first input 304, the second input 306, and the output 308. In the example of FIG. 3, the trigger 302 compares the first voltage signal $V_{SOFT}$ received at the first input 304 and the feedback voltage signal $V_{FB}$ received at the second input 306 and determines whether the magnitude of the first voltage signal $V_{SOFT}$ is within a threshold value of the feedback voltage signal $V_{FB}$. For example, the threshold voltage corresponds to an acceptable difference between the magnitude of the first voltage signal $V_{SOFT}$ and the magnitude of the feedback voltage signal $V_{FB}$ based on the application. The example trigger 302 also configures one or more of the fourth switch 132, the fifth switch 134, or the eighth switch 310 based on the comparison of the first voltage signal $V_{SOFT}$ and the feedback voltage signal $V_{FB}$ via a control signal generated at the output 308. In the example of FIG. 3, the example trigger 302 configures one or more of the fourth switch 132, the fifth switch 134, or the eighth switch 310 at the start of operation of the controller 102 via the control signal generated at the output 308.

In the example of FIG. 3, the latch 125 is a device that maintains a logic value at the output of the latch 125 corresponding to the logic value received at the input of the latch 125. For example, the latch 125 is an SR latch. In other examples, the latch 125 is a D-flip-flop, a JK latch, a gated SR latch, a gated JK latch, a gated D-flip-flop, an Earle latch, or any other suitable latch.

In the illustrated example of FIG. 3, each of the fourth switch 132, the fifth switch 134, the sixth switch 202, and the seventh switch 204 can be implemented by a transistor. For example, each of the fourth switch 132, the fifth switch 134, and the sixth switch 202 is an n-channel MOSFET. In the example of FIG. 3, the seventh switch 204 is a p-channel MOSFET. In other examples, the fourth switch 132, and the fifth switch 134, the sixth switch 202, and the seventh switch 204 are BJTs, JFETs, HBTs, any suitable transistor for the application, and/or any combination thereof. Although many combinations of BJTs, JFETs, HBTs, or any suitable transistors may be used to implement one or more of the fourth switch 132 or the fifth switch 134, it may be desirable in a particular controller to implement each of the fourth switch 132 and the fifth switch 134 with the same switch type (e.g., all n-type BJTs, all p-type BJTs, all p-channel MOSFETs, etc.). In the example of FIG. 3, the eighth switch 310 is a two-to-one multiplexer. In other examples, the eighth switch 310 is a combination of logic circuits.

In the example of FIG. 2, the third inverter 135 is a device that inverts the logic value of the received at the input of the third inverter 135 and outputs the inverted logic value at the output of the third inverter 135. The example third inverter 135 is a NOT logic gate. In additional examples, the third inverter 135 may be a combination of one or more logic gates/logic circuits that invert the logic value of signals received and output the inverted logic value. In an analog implementation, the third inverter 135 may be an inverting amplifier.

In the illustrated example of FIG. 3, in operation, the example trigger 302 configures the error amplifier to be a voltage follower with the trimmed voltage signal $V_{TON}$ as an input to the second non-inverting input 318 and the second inverting input 320 via the second resistor 220. For example, the example trigger 302 configures the fourth switch 132, the fifth switch 134, and the eighth switch 310 to configure the error amplifier 108 to operate as a voltage follower. More specifically, the example trigger 302 closes the fourth switch 132, opens the fifth switch 134, and toggles the eighth switch 310 such that the second terminal of the eighth switch 310 is coupled to the third terminal of the eighth switch 310. By configuring one or more of the fourth switch 132, the fifth switch 134, or the eighth switch 310, the trigger 302 disables the error amplifier 108 from controlling the duration of each of the delay cells of the delay cells 110 based on the feedback voltage signal $V_{FB}$. Rather, by configuring one or more of the fourth switch 132, the fifth switch 134, or the eighth switch 310, the trigger 302 enables the error amplifier 108 to control the duration of each of the delay cells of the delay cells 110 based on the trimmed voltage signal $V_{TON}$. Additionally, the example feed forward voltage controller 116 sets the output of the delay cells 110 (e.g., the PWM signal on time) based on the first voltage signal $V_{SOFT}$ divided by the input voltage signal $V_{IN}$ and multiplied by the period of the oscillator 112. Additionally, by configuring one or more of the fourth switch 132, the fifth switch 134, or the eighth switch 310, the example trigger 302 disables the PWM signal of the delay cells 110 by disconnecting the oscillator 112 from the delay cells 110.

In the illustrated example of FIG. 3, in operation, the trigger 302 monitors the first voltage signal $V_{SOFT}$ to determine whether the first voltage signal $V_{SOFT}$ has initiated soft-start functionality. For example, the trigger 302 monitors the first voltage signal $V_{SOFT}$ and when the trigger 302 detects a positive change in voltage on the first voltage signal $V_{SOFT}$, the trigger 302 determines that the first voltage signal $V_{SOFT}$ has initiated soft-start functionality. When the example trigger 302 determines that the first voltage signal $V_{SOFT}$ has initiated soft-start functionality (e.g., the first voltage signal $V_{SOFT}$ begins to rise), the example trigger 302 monitors the feedback voltage signal $V_{FB}$ and the first voltage signal $V_{SOFT}$ to determine whether the first voltage signal $V_{SOFT}$ is within a threshold difference of the feedback voltage signal $V_{FB}$.

In the illustrated example of FIG. 3, in operation, when the example trigger 302 determines that the first voltage signal $V_{SOFT}$ is within a threshold difference of the feedback voltage signal $V_{FB}$, the example trigger 302 enables the error amplifier 108 to control the power stage 104 based on the feedback voltage signal $V_{FB}$ and the first voltage signal $V_{SOFT}$. For example, when the example trigger 302 determines that the first voltage signal $V_{SOFT}$ is within a threshold difference of the feedback voltage signal $V_{FB}$, the example trigger 302 configures one or more of the fourth switch 132, the fifth switch 134, or the eighth switch 310. More specifically, when the example trigger 302 determines that the first voltage signal $V_{SOFT}$ is within a threshold difference of the feedback voltage signal $V_{FB}$, the example trigger 302 opens the fourth switch 132, closes the fifth switch 134, and toggles the eighth switch 310 such that the first terminal of the eighth switch 310 is coupled to the third terminal of the eighth switch 310. By configuring one or more of the fourth switch 132, the fifth switch 134, or the eighth switch 310, the trigger 302 enables the error amplifier 108 to control the duration of each of the delay cells of the delay cells 110 based on the feedback voltage signal $V_{FB}$ and the first voltage signal $V_{SOFT}$. Additionally, by configuring (e.g., opening and/or closing) one or more of the fourth switch 132, the fifth switch 134, of the eighth switch 310, the example trigger 302 enables the PWM signal of the delay cells 110.

Figure 4:
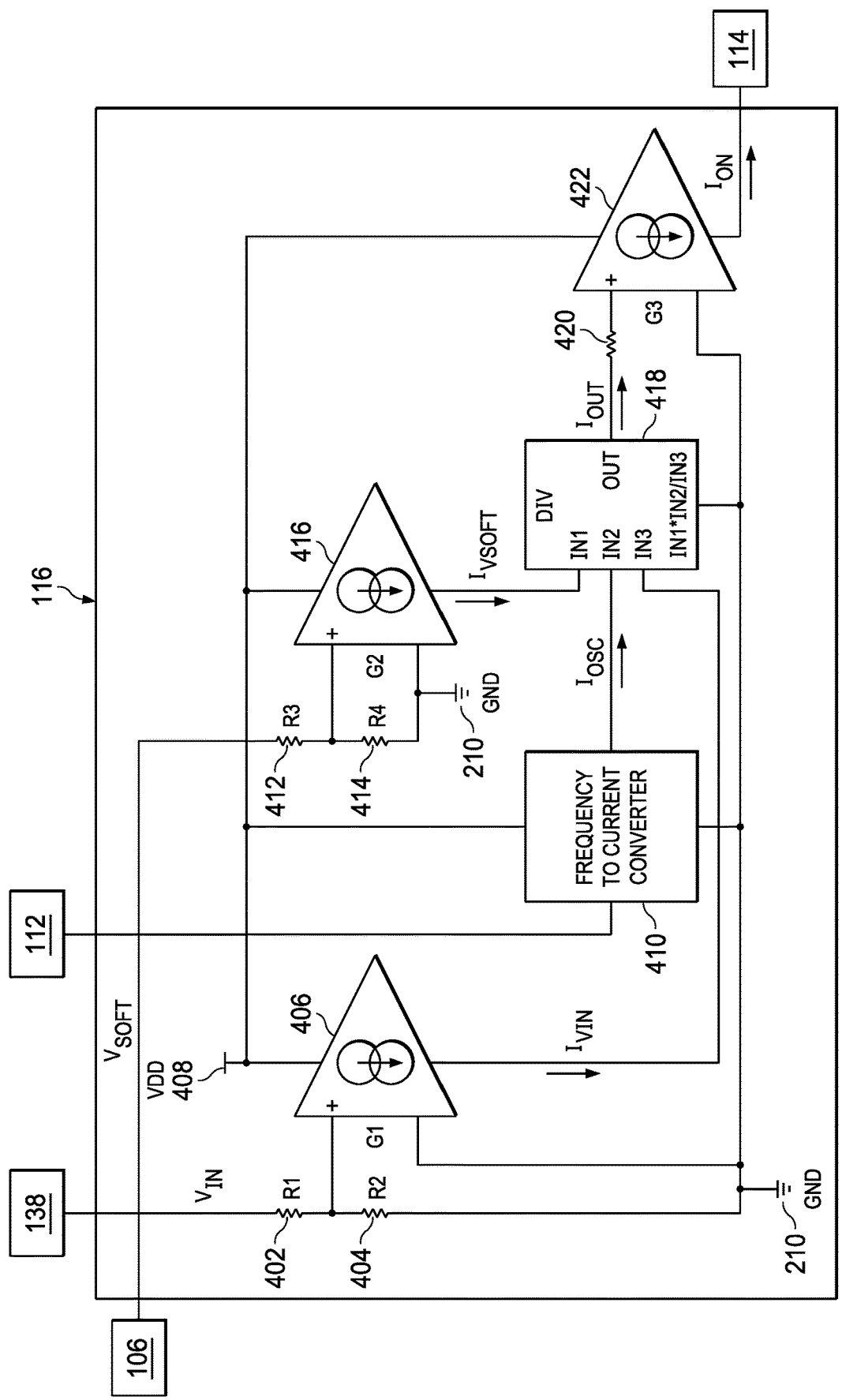
FIG. 4 is a schematic illustration showing further detail of the example voltage feed forward controller of FIG. 1, the example voltage feed forward controller of FIG. 2, and/or the example voltage feed forward controller of FIG. 3.

FIG. 4 is a schematic illustration showing further detail of the example feed forward voltage controller 116 of FIG. 1, the example feed forward voltage controller 116 of FIG. 2, and/or the example feed forward voltage controller 116 of FIG. 3. In the example of FIG. 4, the example feed forward voltage controller 116 includes an example third resistor 402, an example fourth resistor 404, an example first voltage controlled current source 406, an example voltage supply node 408, an example frequency to current converter, an example fifth resistor 412, an example sixth resistor 414, an example second voltage controlled current source 416, an example current multiplier 418, an example seventh resistor 420, an example third voltage controlled current source 422, and the example ground reference node 210.

In the example of FIG. 4, the third resistor 402 is coupled to the example power supply 138, the fourth resistor 404, and the first voltage controlled current source 406. The example fourth resistor 404 is coupled to the third resistor 402, the first voltage controlled current source 406, and the ground reference node 210. Together, the example third resistor 402 and the example fourth resistor 404 form a voltage divider to step-down the voltage level of the power supply 138 (e.g., the input voltage signal $V_{IN}$) to a voltage level that is safe for the first voltage controlled current source 406.

In the example of FIG. 4, the first voltage controlled current source 406 is coupled to the third resistor 402, the fourth resistor 404, the voltage supply node 408, the ground reference node 210, and the current multiplier 418. The example first voltage controlled current source 406 is a device that generates a current $I_{VIN}$ proportional to the voltage set by the voltage divider (e.g., the third resistor 402 and the fourth resistor 404) and corresponding to the input voltage signal $V_{IN}$. For example, the first voltage controlled current source 406 may be implemented by a buffer amplifier coupled to a BJT transistor. For example, in operation of such an implementation, the voltage level set by the voltage divider (e.g., the third resistor 402 and the fourth resistor 404) is input to the buffer amplifier and the example buffer amplifier biases the base of the BJT with the current necessary to cause the voltage level set by the voltage divider to be induced across a resistor included in the first voltage controlled current source 406. In such an implementation, the collector of the BJT is coupled to voltage supply node 408 via a resistor and a voltage supply signal VDD generated at the voltage supply node 408 supplies the current to the collector of the BJT. The emitter of the BJT sources the current that induces across the resistor the voltage level set by the voltage divider. The current $I_{VIN}$ sourced by the emitter of the BJT is transmitted the current multiplier 418.

In the example of FIG. 4, the example frequency to current converter 410 is coupled to the example oscillator 112, the example voltage supply node 408, the example ground reference node 210, and the example current multiplier 418. The example frequency to current converter 410 is a device that converts generates a current $I_{OSC}$ proportional to the frequency of the oscillator signal generated by the oscillator 112. For example, the frequency to current converter 410 may be implemented as a resistor inductor (RL) filter. In such an implementation, the current output to the current multiplier 418 is governed by the gain (e.g., the transfer function) of the RL filter. The gain of the example RL filter is related to the frequency of the input signal (e.g., the oscillator signal generated by the oscillator 112). Thus, the current $I_{OSC}$ output to the current multiplier 418 from the frequency to current converter 410 is related to the frequency of the oscillator signal generated by the oscillator 112 based on the gain of the frequency to current converter 410.

In the example of FIG. 4, the fifth resistor 412 is coupled to the example reference voltage generator 106, the sixth resistor 414, and the second voltage controlled current source 416. The example fifth resistor 412 is coupled to the sixth resistor 414, the second voltage controlled current source 416, and the ground reference node 210. Together, the example fifth resistor 412 and the example sixth resistor 414 form a voltage divider to step-down the voltage level of the reference voltage generator 106 (e.g., the first voltage signal $V_{SOFT}$) to a voltage level that is safe for the second voltage controlled current source 416.

In the example of FIG. 4, the second voltage controlled current source 416 is coupled to the fifth resistor 412, the sixth resistor 414, the voltage supply node 408, the ground reference node 210, and the current multiplier 418. The example second voltage controlled current source 416 is a device that generates a current $I_{VSOFT}$ proportional to the voltage set by the voltage divider (e.g., the fifth resistor 412 and the sixth resistor 414) and corresponding to the first voltage signal $V_{SOFT}$. For example, the second voltage controlled current source 416 may be implemented by a buffer amplifier coupled to a BJT transistor. For example, in operation of such an implementation, the voltage level set by the voltage divider (e.g., the fifth resistor 412 and the sixth resistor 414) is input to the buffer amplifier and the example buffer amplifier biases the base of the BJT with the current necessary to cause the voltage level set by the voltage divider to be induced across a resistor included in the second voltage controlled current source 416. In such an implementation, the collector of the BJT is coupled to voltage supply node 408 via a resistor and the voltage supply signal VDD generated at the voltage supply node 408 supplies the current to the collector of the BJT. The emitter of the BJT sources the current that induces across the resistor the voltage level set by the voltage divider. The current $I_{VSOFT}$ sourced by the emitter of the BJT is transmitted the current multiplier 418.

In the example of FIG. 4, the example current multiplier 418 is coupled to the first voltage controlled current source 406, the frequency to current converter 410, the second voltage controlled current source 416, the ground reference node 210, and the third voltage controlled current source 422 via the seventh resistor 420. The example current multiplier 418 is a device that multiplies the current $I_{VIN}$ supplied by the first voltage controlled current source 406 with the current $I_{OSC}$ supplied by the frequency to current converter 410 and the current $I_{VSOFT}$ supplied by the second voltage controlled current source 416. For example, the current multiplier 418 may be implemented by one or more cascaded current mirrors. The example current multiplier 418 multiplies the current $I_{VIN}$ supplied by the first voltage controlled current source 406, the current $I_{OSC}$ supplied by the frequency to current converter 410, and the current $I_{VSOFT}$ supplied by the second voltage controlled current source 416 to generate an output current $I_{OUT}$ according to equation 1 below:

$$I_{OUT} = k * \frac{I_{VSOFT} * I_{OSC}}{I_{VIN}} \qquad \text{Equation-1}$$

In the example of FIG. 4, equation 1 includes the current $I_{VSOFT}$, the current $I_{OSC}$, the current $I_{VIN}$, and a scaling factor k. In the example of FIG. 4, the scaling factor is related to the duration of each of the delay cells 110. The resultant output current $I_{OUT}$ is supplied to the third voltage controlled current source 422 via the seventh resistor 420.

In the example of FIG. 4, the second voltage controlled current source 416 is coupled to the current multiplier 418 via the seventh resistor 420, the voltage supply node 408, the ground reference node 210, and the ADC 114. The example third voltage controlled current source 422 is a device that generates a current $I_{ON}$ proportional to the voltage set by the voltage drop across the seventh resistor 420 caused by the current $I_{OUT}$. For example, the third voltage controlled current source 422 may be implemented by a buffer amplifier coupled to a BJT transistor. For example, in operation of such an implementation, the voltage level set by the voltage drop across the seventh resistor 420 is input to the buffer amplifier and the example buffer amplifier biases the base of the BJT with the current necessary to cause the voltage level set by the voltage drop across the seventh resistor 420 to be induced across a resistor included in the third voltage controlled current source 422. In such an implementation, the collector of the BJT is coupled to voltage supply node 408 via a resistor and the voltage supply signal VDD generated at the voltage supply node 408 supplies the current to the collector of the BJT. The emitter of the BJT sources the current that induces across the resistor the voltage level set by the voltage divider. The current $I_{ON}$ sourced by the emitter of the BJT is transmitted the ADC 114.

Figure 5:
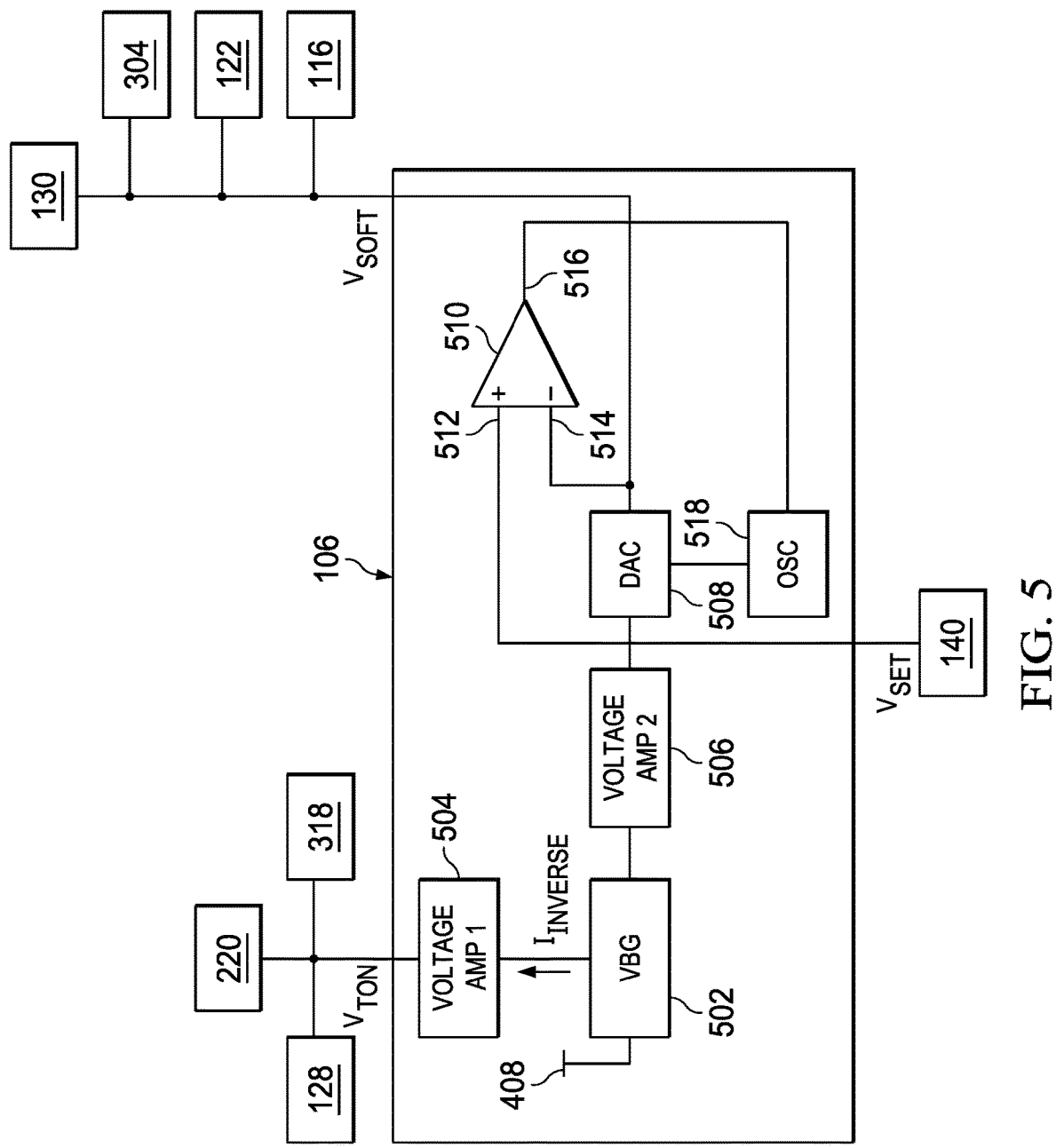
FIG. 5 is a schematic illustration showing further detail of the example reference voltage generator of FIG. 1, the example reference voltage generator of FIG. 2, and/or the example reference voltage generator of FIG. 3.

FIG. 5 is a schematic illustration showing further detail of the example reference voltage generator 106 of FIG. 1, the example reference voltage generator 106 of FIG. 2, and/or the example reference voltage generator 106 of FIG. 3. The example reference voltage generator 106 includes an example bandgap voltage source 502, an example first voltage amplifier 504, an example second voltage amplifier 506, an example digital to analog converter 508, an example comparator 510 including an input 512, an input 514, and an output 516, an example oscillator 518, and the example voltage supply node 408.

In the example of FIG. 5, the bandgap voltage source 502 is coupled to the voltage supply node 408, the first voltage amplifier 504, and the second voltage amplifier 506. In the example of FIG. 5, the bandgap voltage source 502 is a circuit that generates a signal that is at a voltage level (e.g., 1.25 volts) independent of operating temperature and voltage supply variations. Additionally, the example bandgap voltage source 502 is configured to generate a current $I_{INVERSE}$ that is inversely proportional to the temperature of the reference voltage generator 106. In this manner, as the temperature of the reference voltage generator 106 increases, the current $I_{INVERSE}$ decreases and as the temperature of the reference voltage generator 106 decreases, the current $I_{INVERSE}$ increases. For example, the bandgap voltage source 502 may be implemented by a Brokaw bandgap circuit. In other examples, the bandgap voltage source 502 may be any circuit that generates a bandgap reference voltage and the current $I_{INVERSE}$.

In the example of FIG. 5, the example first voltage amplifier 504 is coupled to the bandgap voltage source 502, the first terminal of the second switch 128, the second resistor 220, and the second non-inverting input 318 of the differential difference amplifier 312. The example first voltage amplifier 504 is a device configured to generate the trimmed voltage signal $V_{TON}$ based on the current $I_{INVERSE}$. For example, the first voltage amplifier 504 may be implemented by a transimpedance amplifier. In other examples, the example first voltage amplifier 504 may be implemented by any suitable amplifier. In the example the second voltage amplifier 506 is coupled to the bandgap voltage source 502 and the digital to analog converter 508. The example second voltage amplifier 506 is a device configured to generate a signal with an arbitrary voltage level that is set to be larger than any voltage level that may be input via the voltage input 140 as the $V_{SET}$ signal. For example, the second voltage amplifier 506 may be implemented by a non-inverting amplifier. In other examples, the example second voltage amplifier 506 may be implemented by any suitable amplifier.

In the illustrated example of FIG. 5, the digital to analog converter 508 is coupled to the second voltage amplifier 506, the second input 514 of the comparator 510, the oscillator 518, the feed forward voltage controller 116, the second input 122 of the comparator 118, the second input 122 of the comparator 118, the first terminal of the third switch 130, and the first input 304 of the trigger 302. The example digital to analog converter 508 is a device that samples an input voltage at a specified frequency. For example, the digital to analog converter 508 may be implemented by a twelve-bit digital to analog converter. In other examples, any suitable digital to analog converter may be used.

In the example of FIG. 5, the example comparator 510 is coupled to the voltage input 140 at the first input 512, the digital to analog converter 508 at the second input 514, and the oscillator 518 at the output 516. The example comparator 510 is an analog comparator including the first input 512, the second input 514, and the output 516. In the example of FIG. 5, the comparator 510 compares the voltage signal generated by the digital to analog converter 508 and the voltage received from the voltage input (e.g., the $V_{SET}$ signal) and determines whether the magnitude of the voltage signal received from the digital to analog converter 508 is within a threshold value of the magnitude of the $V_{SET}$ voltage signal. For example, the threshold voltage corresponds to an acceptable difference between the magnitude of the voltage signal generated by the digital to analog converter 508 and the magnitude of the $V_{SET}$ signal based on the application. When the comparator 510 determines that the voltage signal generated by the digital to analog converter 508 is within the threshold voltage the $V_{SET}$ signal, the comparator 510 generates a control signal at the output 516.

In the example of FIG. 5, the example oscillator 518 is coupled to the example digital to analog converter 508 and the example comparator 510 at the output 516. The example oscillator 1518 may be implemented by a phase lock looped oscillator. In other examples, the oscillator 518 is a capacitor (RC) oscillator, a ring oscillator, a crystal oscillator, or any other suitable oscillator for the application. The example oscillator 518 produces an oscillating signal. In FIG. 5, the oscillating signal may be a periodic and/or aperiodic signal generated to initiate the sampling of the digital to analog converter 508. Additionally, the example oscillator 518 includes the functionality to be enabled and disabled.

In the example of FIG. 5, the example digital to analog converter 508 samples the voltage level of the voltage signal generated by the second voltage amplifier 506 at the frequency of the oscillator 518 (e.g., at the rising edge of the signal generated by the oscillator 518). Because the digital to analog converter 508 samples the voltage signal generated by the second voltage amplifier 506, the voltage level of the signal generated by the digital to analog converter 508. Thus, as the digital to analog converter 508 samples the signal generated by the second voltage amplifier 506, the voltage level at the second input 514 slowly steps up to the voltage level of the signal generated by the second voltage amplifier 506 at the frequency of the oscillator 518. When the comparator 510 determines that the voltage level at the first input 512 (e.g., the voltage level of the $V_{SET}$ signal) is within a threshold voltage of the voltage level at the second input 514 (e.g., the first voltage signal $V_{SOFT}$), the comparator 510 generates a control signal at the output 516 to disable the oscillator 518. In some examples, when the comparator 510 generates the control signal at the output 516, the comparator 510 additionally transmits the control signal to a switch that switches the voltage level on the first voltage signal $V_{SOFT}$ from the voltage level at the output of the digital to analog converter 508 to the voltage level of the $V_{SET}$ signal.

Figure 6:
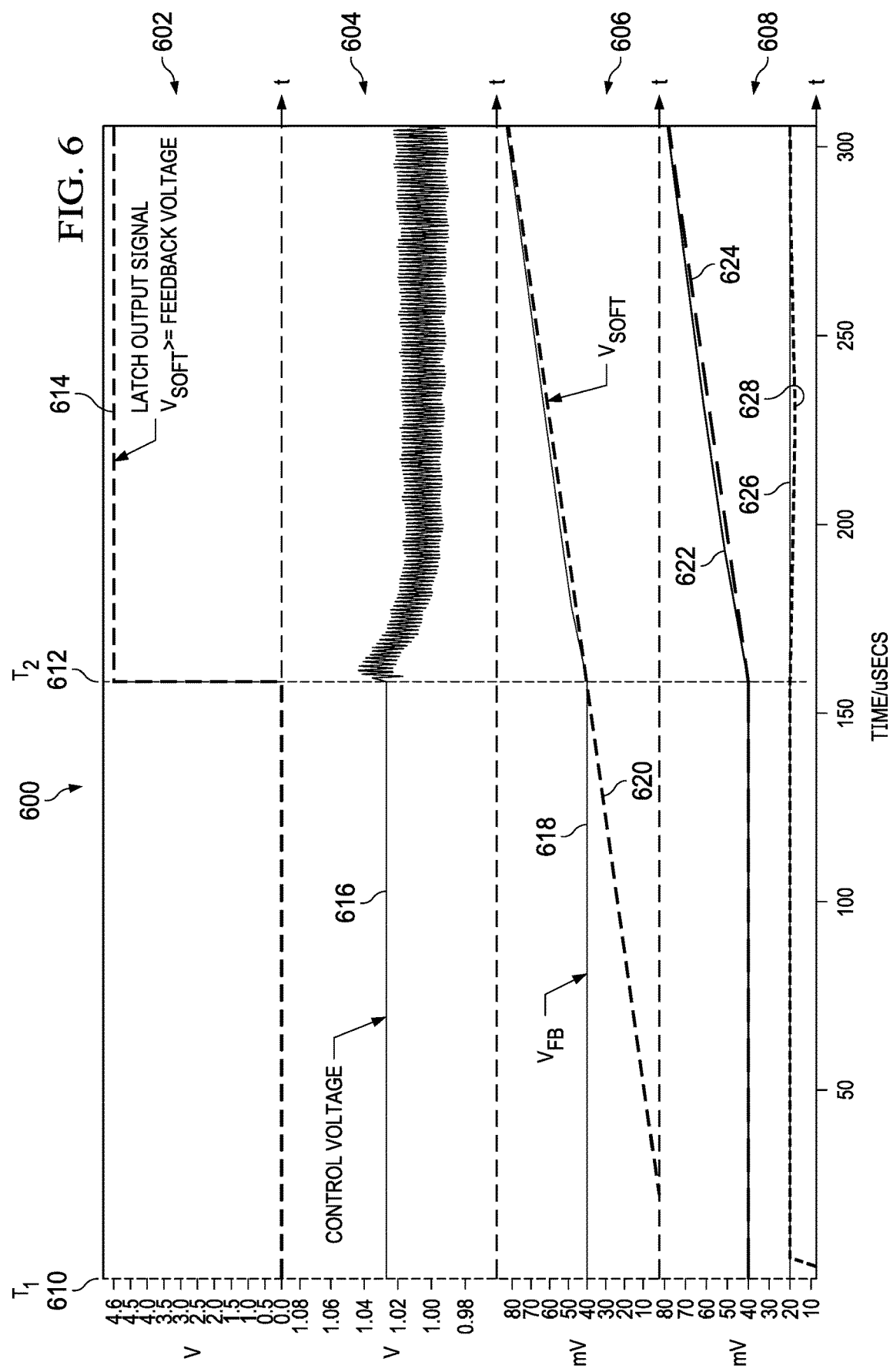
FIG. 6 is a timing diagram illustrating operation of the example power converter system of FIG. 1, the example power converter system of FIG. 2, and/or the example power converter system of FIG. 3.

FIG. 6 is a timing diagram 600 illustrating operation of the example power converter system 100 of FIG. 1, the example power converter system 200 of FIG. 2, and/or the example power converter system 300 of FIG. 3. The timing diagram 600 includes an example first plot 602, an example second plot 604, an example third plot 606, an example fourth plot 608, an example first time 610 ($T_1$), and an example second time 612 ($T_2$). The example first plot 602 includes an example latch output curve 614. The example second plot 604 includes an example error amplifier output curve 616, and the example third plot 606 includes an example feedback voltage curve 618 and an example soft-start curve 620. The example fourth plot 608 includes an example first non-inverting input curve 622, an example first inverting input curve 624, an example second non-inverting input curve 626, and an example second inverting input curve 628.

In the illustrated example of FIG. 6, the first plot 602 illustrates the output of the example latch 125 as controlled by the output 124 of the example comparator 118 and/or the output 308 of the example trigger 302 versus time. In the example the latch output curve 614 represents an analog voltage generated by the latch 125 as controlled by the output 124 of the comparator 118 and/or the output 308 of the trigger 302. The example second plot 604 illustrates the output of the error amplifier 108 versus time. The example error amplifier output curve 616 illustrates the voltage level at the output of the error amplifier 108 as governed by the output 226 of the operational amplifier 218 and/or the output 322 of the example differential difference amplifier 312 of FIG. 3. The example third plot 606 represents the various voltages in the controller 102 versus time. The example feedback voltage curve 618 represents the feedback voltage signal $V_{FB}$ monitored by the error amplifier 108 at the output voltage node $V_O$ of the power stage 104 via the voltage divider 117. The example soft-start curve 620 represents the first voltage signal $V_{SOFT}$ generated by the reference voltage generator 106. The example first non-inverting input curve 622 represents the voltage level at first non-inverting input 314 of the differential difference amplifier 312. The example first inverting input curve 624 represents the voltage level at the first inverting input 316 of the differential difference amplifier 312. The example second non-inverting input curve 626 represents the voltage level at the second non-inverting input 318 of the differential difference amplifier 312. The example second inverting input curve 628 represents the voltage level at the second inverting input 320 of the differential difference amplifier 312.

In the illustrated example of FIG. 6, the first time 610 represents start up of one or more of the power converter system 100, the power converter system 200, or the power converter system 300. For example, the first time 610 may represent power being connected to the controller 102. In other examples, the first time 610 represents the controller 102 receiving an enable signal. At the first time 610, the latch output curve 614 is at a value of zero volts, the error amplifier output curve 616 is at a value of 1.03 volts, the feedback voltage curve 618 is at a value of 40 millivolts (mV), and the soft-start curve 620 is at a value of zero mV. Additionally, at the first time 610, the first non-inverting input curve 622 is at a value of 40 mV, the first inverting input curve 624 is at a value of 40 mV, the second non-inverting input curve 626 is at a value of 20 mV, and the second inverting input curve 628 is at a value of zero mV. In the illustrated example of FIG. 1, at the first time 610, the comparator 118 opens the first switch 126, closes the second switch 128, opens the third switch 130, closes the fourth switch 132, and opens the fifth switch 134. In the illustrated example of FIG. 2, at the first time 610, the comparator 118 opens the first switch 126, closes the second switch 128, opens the third switch 130, closes the fourth switch 132, and opens the fifth switch 134. In the illustrated example of FIG. 3, at the first time 610, the trigger 302 closes the fourth switch 132, opens the fifth switch 134, and configures the eighth switch 310 such that the second terminal of the eighth switch 310 is coupled to the third terminal of the eighth switch 310. At the first time 610, the comparator 118 and/or the trigger 302 closes and/or opens one or more of the first switch 126, the second switch 128, the third switch 130, the fourth switch 132, the fifth switch 134, or the eighth switch 310 to configure the error amplifier 108 to control the duration of each of the delay cells of the delay cells 110 based on the trimmed voltage signal $V_{TON}$. In alternative examples, the comparator 118 closes and/or opens one or more of the first switch 126, the second switch 128, the third switch 130, the fourth switch 132, or the fifth switch 134 to configure the error amplifier 108 to control the duration of each of the delay cells of the delay cells 110 based on the trimmed voltage signal $V_{TON}$. Additionally, at the example first time 610, the example feed forward voltage controller 116 sets the output of the delay cells 110 (e.g., the PWM signal) based on the first voltage signal $V_{SOFT}$ divided by the input voltage signal $V_{IN}$ and multiplied by the period of the oscillator 112. Additionally, by configuring one or more of the first switch 126, the second switch 128, the third switch 130, the fourth switch 132, the fifth switch 134, or the eighth switch 310, the example comparator 118 and/or the trigger 302 disables the PWM signal of the delay cells 110.

In the illustrated example of FIG. 6, between the first time 610 and the second time 612, the reference voltage generator 106 begins to ramp up the first voltage signal $V_{SOFT}$ from zero to a voltage corresponding to a desired voltage on the output voltage node $V_O$ of the power stage 104 (e.g., the $V_{SET}$ signal). Between the first time 610 and the second time 612, the latch output curve 614 remains at zero volts, the error amplifier output curve 616 remains at 1.03 volts, the feedback voltage curve 618 remains at 40 mV, and the soft-start curve 620 begins to rise to a value corresponding to a desired voltage at the output voltage node $V_O$ of the power stage 104. Additionally, between the first time 610 and the second time 612, the first non-inverting input curve 622 remains at a value of 40 mV, the first inverting input curve 624 remains at a value of 40 mV, the second non-inverting input curve 626 remains at a value of 20 mV, and the second inverting input curve 628 begins to rise to the voltage level at the second non-inverting input 318 of the differential difference amplifier 312.

In the illustrated example of FIG. 6, the second time 612 represents the time at which the feedback voltage signal $V_{FB}$ equals the first voltage signal $V_{SOFT}$. At the second time 612, the latch output curve 614 transitions from zero volts to 4.6 volts, the error amplifier output curve 616 transitions from a constant voltage of 1.03 volts to a voltage that is dependent on the gain of the error amplifier feedback network of the error amplifier 108, the feedback voltage curve 618 is at a value of 40 mV, and the soft-start curve 620 is at a value greater than or equal to 40 mV. Additionally, at the second time 612, the first non-inverting input curve 622 is at a value of 40 mV, the first inverting input curve 624 is at a value of 40 mV, the second non-inverting input curve 626 is at a value of 20 mV, and the second inverting input curve 628 is at 20 mV. In the illustrated example of FIG. 1, at the second time 612, the example comparator 118 closes the first switch 126, opens the second switch 128, closes the third switch 130, opens the fourth switch 132, and closes the fifth switch 134. In the illustrated example of FIG. 2, at the second time 612, the example comparator 118 closes the first switch 126, opens the second switch 128, closes the third switch 130, opens the fourth switch 132, and closes the fifth switch 134. In the illustrated example of FIG. 3, at the second time 612, the example trigger 302 opens the fourth switch 132, closes the fifth switch 134, and toggles the eighth switch 310 such that the first terminal of the eighth switch 310 is coupled to the third terminal of the eighth switch 310. At the second time 612, the comparator 118 and/or the trigger 302 closes and/or opens one or more of the first switch 126, the second switch 128, the third switch 130, the fourth switch 132, the fifth switch 134, or the eighth switch 310 to enable the error amplifier 108 to control the duration of each of the delay cells of the delay cells 110 based on the feedback voltage signal $V_{FB}$ and the first voltage signal $V_{SOFT}$. In alternative examples, the comparator 118 closes and/or opens one or more of the first switch 126, the second switch 128, the third switch 130, the fourth switch 132, or the fifth switch 134 to configure the error amplifier 108 to control the duration of each of the delay cells of the delay cells 110 based on the feedback voltage signal $V_{FB}$ and the first voltage signal $V_{SOFT}$. Additionally, by configuring one or more of the first switch 126, the second switch 128, the third switch 130, the fourth switch 132, and the fifth switch 134, the example comparator 118 and/or the example trigger 302 enables the PWM signal of the delay cells 110.

In the illustrated example of FIG. 6, after the second time 612, the example latch output curve 614 remains at 4.6 volts, the example error amplifier output curve 616 continues to depend on the gain of the error amplifier feedback network of the error amplifier 108, the example feedback voltage curve 618 varies slightly about the voltage level of the first voltage signal $V_{SOFT}$, and the example soft-start curve 620 continues to ramp up to the value corresponding to a desired voltage at the output voltage node $V_O$ of the power stage 104 (e.g., the $V_{SET}$ signal). Additionally, after the second time 612, the first non-inverting input curve 622 varies slightly about the voltage level of the first voltage signal $V_{SOFT}$, the first inverting input curve 624 continues to ramp up to the value corresponding to a desired voltage level at the output voltage node $V_O$ of the power stage 104 (e.g., the $V_{SET}$ signal), the second non-inverting input curve 626 remains at a value of 20 mV, and the second inverting input curve 628 varies slightly about the voltage level of the trimmed voltage signal $V_{TON}$. In FIG. 6, the difference between the voltage level of the first non-inverting input curve 622 and the voltage level of the first inverting input curve 624 is substantially similar to the difference between the voltage level of the second non-inverting input curve 626 and the voltage level of the second inverting input curve 628.

Figure 7:
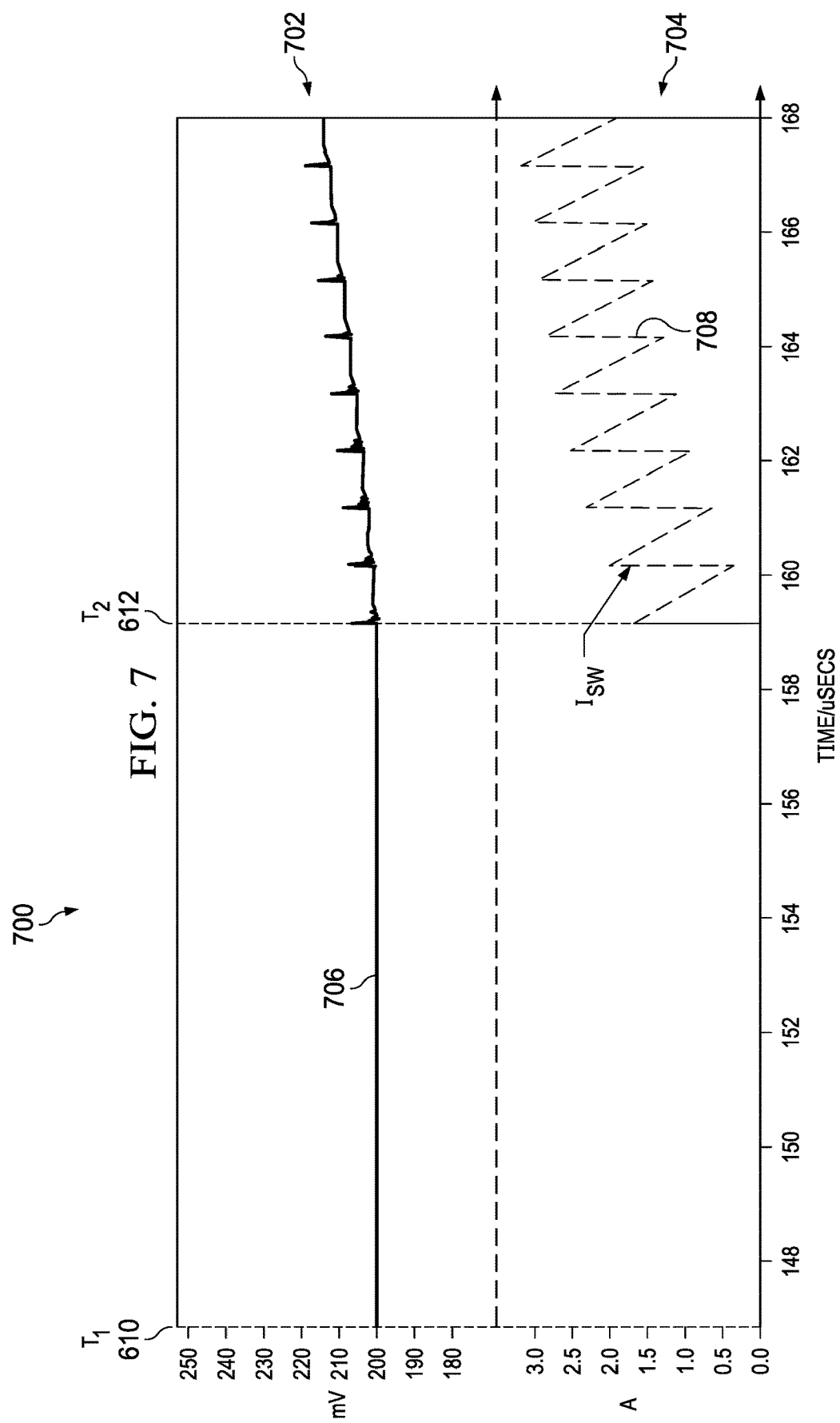
FIG. 7 is a timing diagram illustrating additional operation of the example power converter system of FIG. 1, the example power converter system of FIG. 2, and/or the example power converter system of FIG. 3.

FIG. 7 is a timing diagram 700 illustrating additional operation of the example power converter system 100 of FIG. 1, the example power converter system 200 of FIG. 2, and/or the example power converter system 300 of FIG. 3. The timing diagram 700 includes an example fifth plot 702, an example sixth plot 704, the example first time 610 ($T_1$), and the example second time 612 ($T_2$). The example fifth plot 702 includes an example output voltage curve 706. The example sixth plot 704 includes an example converter current curve 708.

In the illustrated example of FIG. 7, the fifth plot 702 illustrates the differential voltage level at the output voltage node $V_O$ of the power stage 104 versus time. In the example the output voltage curve 706 represents the differential voltage level at the output voltage node $V_O$ of the power stage 104. The example sixth plot 704 illustrates the current $I_{SW}$ through the inductor 206 versus time. The example converter current curve 708 illustrates the current $I_{SW}$ through the inductor 206 of FIGS. 2 and 3. In other examples, the example converter current curve 708 represents the current through power stage 104 of FIG. 1.

In the illustrated example of FIG. 7, the first time 610 represents startup of one or more of the power converter system 100, the power converter system 200, or the power converter system 300. For example, the first time 610 may represent power being connected to the controller 102. In other examples, the first time 610 represents the controller 102 receiving an enable signal. At the first time 610, the output voltage curve 706 is at a value of 200 mV and the converter current curve 708 is at a value of zero amps. In the illustrated example of FIG. 1, at the first time 610, the comparator 118 opens the first switch 126, closes the second switch 128, opens the third switch 130, closes the fourth switch 132, and opens the fifth switch 134. In the illustrated example of FIG. 2, at the first time 610, the comparator 118 opens the first switch 126, closes the second switch 128, opens the third switch 130, closes the fourth switch 132, and opens the fifth switch 134. In the illustrated example of FIG. 3, at the first time 610, the comparator 118 closes the fourth switch 132, opens the fifth switch 134, and configures the eighth switch 310 such that the second terminal of the eighth switch 310 is coupled to the third terminal of the eighth switch 310. At the first time 610, the comparator 118 and/or the trigger 302 closes and/or opens one or more of the first switch 126, the second switch 128, the third switch 130, the fourth switch 132, the fifth switch 134, or the eighth switch 310 to configure the error amplifier 108 to control the duration of each of the delay cells of the delay cells 110 in response to the trimmed voltage signal $V_{TON}$. Additionally, at the example first time 610, the example feed forward voltage controller 116 sets the output of the delay cells 110 (e.g., the PWM signal) to track the first voltage signal $V_{SOFT}$ divided by the input voltage signal $V_{IN}$ and multiplied by the period of the oscillator 112. Additionally, by configuring one or more of the first switch 126, the second switch 128, the third switch 130, the fourth switch 132, the fifth switch 134, or the eighth switch 310, the example comparator 118 and/or the example trigger 302 disables the PWM signal of the delay cells 110.

In the illustrated example of FIG. 7, between the first time 610 and the second time 612, the reference voltage generator 106 begins to ramp up the first voltage signal $V_{SOFT}$ from zero to a voltage corresponding to a desired voltage on the output voltage node $V_O$ of the power stage 104. Between the first time 610 and the second time 612, the output voltage curve 706 remains at 200 mV and the converter current curve 708 remains at a value of zero amps.

In the illustrated example of FIG. 7, the second time 612 represents the time at which the feedback voltage signal $V_{FB}$ equals the first voltage signal $V_{SOFT}$. At the second time 612, the output voltage curve 706 begins to rise as the output voltage level at the output voltage node $V_O$ of the power stage 104 and the converter current curve 708 begins to rise and then fall as the magnetic field of the inductor 206 charges and discharges. In the illustrated example of FIG. 1, at the second time 612, the example comparator 118 closes the first switch 126, opens the second switch 128, closes the third switch 130, opens the fourth switch 132, and closes the fifth switch 134. In the illustrated example of FIG. 2, at the second time 612, the example comparator 118 closes the first switch 126, opens the second switch 128, closes the third switch 130, opens the fourth switch 132, and closes the fifth switch 134. In the illustrated example of FIG. 3, at the second time 612, the example trigger 302 opens the fourth switch 132, closes the fifth switch 134, and toggles the eighth switch 310 such that the first terminal of the eighth switch 310 is coupled to the third terminal of the eighth switch 310. At the second time 612, the comparator 118 and/or the trigger 302 closes and/or opens one or more of the first switch 126, the second switch 128, the third switch 130, the fourth switch 132, the fifth switch 134, or the eighth switch 310 to enable the error amplifier 108 to control the duration of each of the delay cells of the delay cells 110 based on the feedback voltage signal $V_{FB}$ and the first voltage signal $V_{SOFT}$. Additionally, by configuring one or more of the first switch 126, the second switch 128, the third switch 130, the fourth switch 132, and the fifth switch 134, the example comparator 118 and/or the example trigger 302 enables the PWM signal of the delay cells 110.

In the illustrated example of FIG. 7, after the second time 612, the example output voltage curve 706 continues to rise and the example converter current curve 708 continues to rise and then fall while trending to a higher current value.

Figure 8:
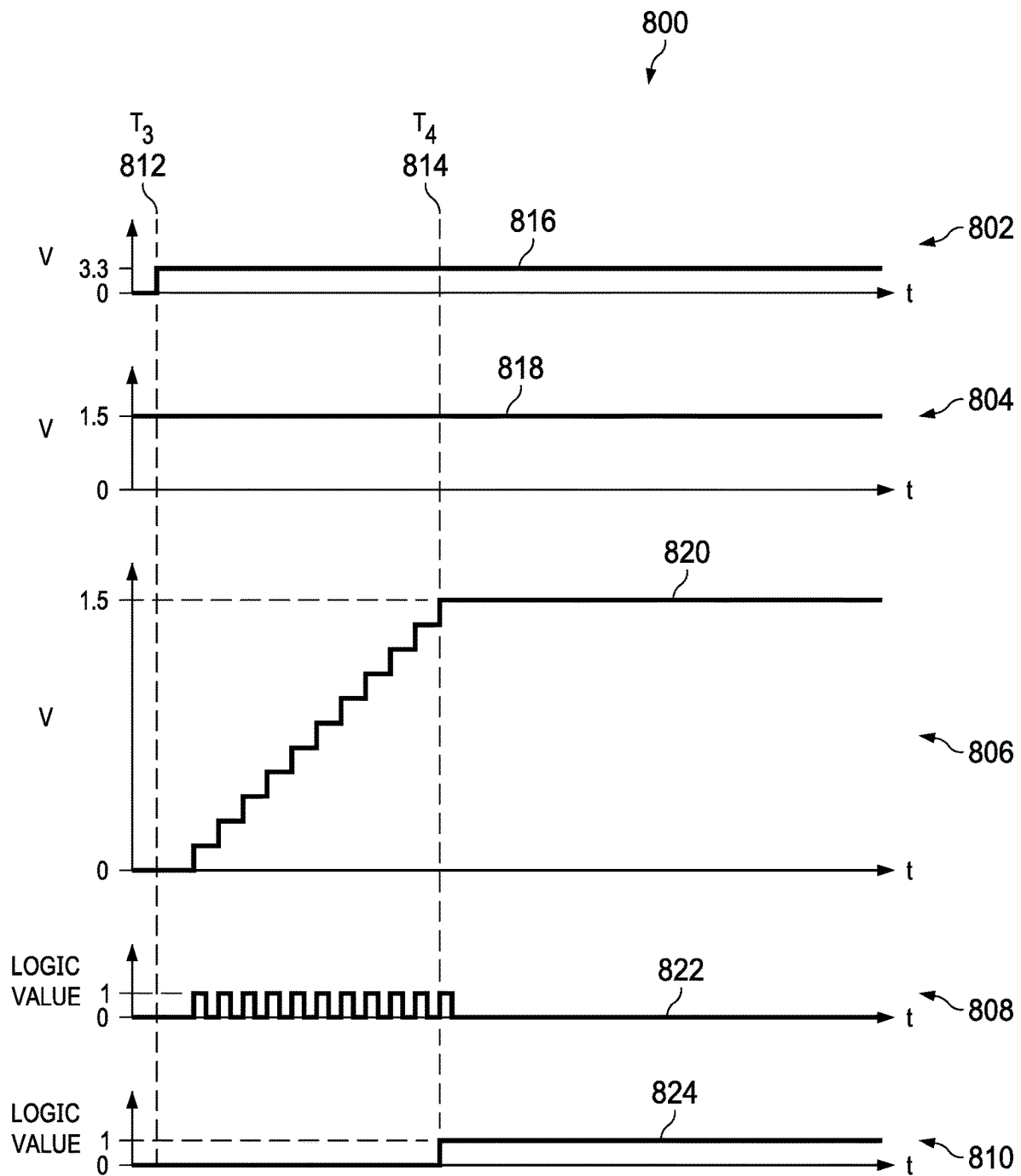
FIG. 8 is a timing diagram illustrating operation of the example reference voltage generator of FIG. 1, the example reference voltage generator of FIG. 2, and/or the example reference voltage generator of FIG. 3.

FIG. 8 is a timing diagram 800 illustrating operation of the example reference voltage generator 106 of FIG. 1, the example reference voltage generator 106 of FIG. 2, and/or the example reference voltage generator 106 of FIG. 3. The example timing diagram 800 includes an example seventh plot 802, an example eighth plot 804, an example ninth plot 806, an example tenth plot 808, an example eleventh plot 810, an example third time 812 ($T_3$), and an example fourth time 814 ($T_4$).

In the example of FIG. 8, the seventh plot 802 includes an example supply voltage curve 816, the eighth plot 804 includes an example set voltage curve 818, the ninth plot 806 includes an example soft-start curve 820, the tenth plot 808 includes an example oscillator curve 822, and the eleventh plot 810 includes an example comparator output curve 824.

In the illustrated example of FIG. 8, the seventh plot 802 illustrates the voltage level of the voltage supply signal VDD generated at the voltage supply node 408. The example supply voltage curve 816 represents voltage level of the voltage supply signal VDD. The example eighth plot 804 illustrates the voltage level at the voltage input 140 versus time. The example set voltage curve 818 illustrates the voltage level of the $V_{SET}$ signal. The example ninth plot 806 illustrates the voltage level of the digital to analog converter 508 versus time. The example soft-start curve 820 illustrates the first voltage signal $V_{SOFT}$ generated by the digital to analog converter 508. The example tenth plot 808 illustrates the frequency of the oscillator 518 versus time. The example oscillator curve 822 illustrates the oscillator signal generated by the oscillator 518. The example eleventh plot 810 illustrates the logic value of the output 516 of the comparator 510 versus time. The example comparator output curve 824 illustrates the logic value generated at the output 516.

In the illustrated example of FIG. 8, the third time 812 represents start up of one or more of the power converter system 100, the power converter system 200, or the power converter system 300. For example, the third time 812 may represent power being connected to the controller 102 (e.g., the voltage level of the supply voltage signal VDD rising). At the third time 812, the supply voltage curve 816 is at a value of 3.3 V, the set voltage curve 818 is at value of 1.5 V, the soft-start curve 820 is at a value of zero volts, the oscillator curve 822 is at a logic low value, and the comparator output curve 824 is at a logic low value.

In the illustrated example of FIG. 8, between the third time 812 and the fourth time 814, the first voltage signal $V_{SOFT}$ is rising to the voltage level on the $V_{SET}$ signal. Between the third time 812, and the fourth time 814, the supply voltage curve 816 remains at a value of 3.3 V, the set voltage curve 818 remains at value of 1.5 V, the soft-start curve 820 begins to rise from zero volts to 1.5 V incrementally (e.g., at the rising edge of the oscillator curve 822), the oscillator curve 822 begins to oscillate at a frequency of the oscillator 518, and the comparator output curve 824 remains at a logic low value.

In the illustrated example of FIG. 8, the fourth time 814 represents the time at which the soft-start voltage level one or more of the power converter system 100, the power converter system 200, or the power converter system 300 meets the preset or desired voltage level (e.g., the $V_{SET}$ signal). At the fourth time 814, the supply voltage curve 816 is at a value of 3.3 V, the set voltage curve 818 is at value of 1.5 V, the soft-start curve 820 is at a value of 1.5 V, the oscillator curve 822 is at a logic high value (e.g., a rising edge), and the comparator output curve 824 transitions from a logic low value to a logic high value. In the example of FIG. 5, at the fourth time 814, the voltage level generated by the digital to analog converter 508 and the voltage level at the voltage input 140 are substantially similar. At the fourth time 814, the example comparator 510 generates a logic high value at the output 516 to disable the oscillator 518.

In the illustrated example of FIG. 8, after the fourth time 814, the supply voltage curve 816 remains at a value of 3.3 V, the set voltage curve 818 remains at value of 1.5 V, the soft-start curve 820 remains at a value of 1.5 V, the oscillator curve 822 transitions from a logic high value to a logic low value and remains at a logic low value, and the comparator output curve 824 remains at a logic high value.

While an example manner of implementing the controller 102 of FIG. 1 is illustrated in FIGS. 2 and 3, one or more of the elements, processes and/or devices illustrated in FIGS. 2 and 3 may be combined, divided, re-arranged, omitted, eliminated and/or implemented in any other way. Further, the example reference voltage generator 106, the example error amplifier 108, the example delay cells 110, the example oscillator 112, the example ADC 114, the example feed forward voltage controller 116, the example comparator 118 and/or, more generally, the example controller 102 of FIGS. 1, 2, and 3 may be implemented by hardware, software, firmware and/or any combination of hardware, software and/or firmware. Thus, for example, any of the example reference voltage generator 106, the example error amplifier 108, the example delay cells 110, the example oscillator 112, the example ADC 114, the example feed forward voltage controller 116, the example comparator 118 and/or, more generally, the example controller 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example reference voltage generator 106, the example error amplifier 108, the example delay cells 110, the example oscillator 112, the example ADC 114, the example feed forward voltage controller 116, the example comparator 118, and/or the example controller 102 is/are hereby expressly defined to include a non-transitory computer readable storage device or storage disk such as a memory, etc. including the software and/or firmware. Further still, the example controller 102 of FIGS. 1, 2, and 3 may include one or more elements, processes and/or devices in addition to, or instead of, those illustrated in FIG. 9, and/or may include more than one of any or all of the illustrated elements, processes and devices. As used herein, the phrase in communication, including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
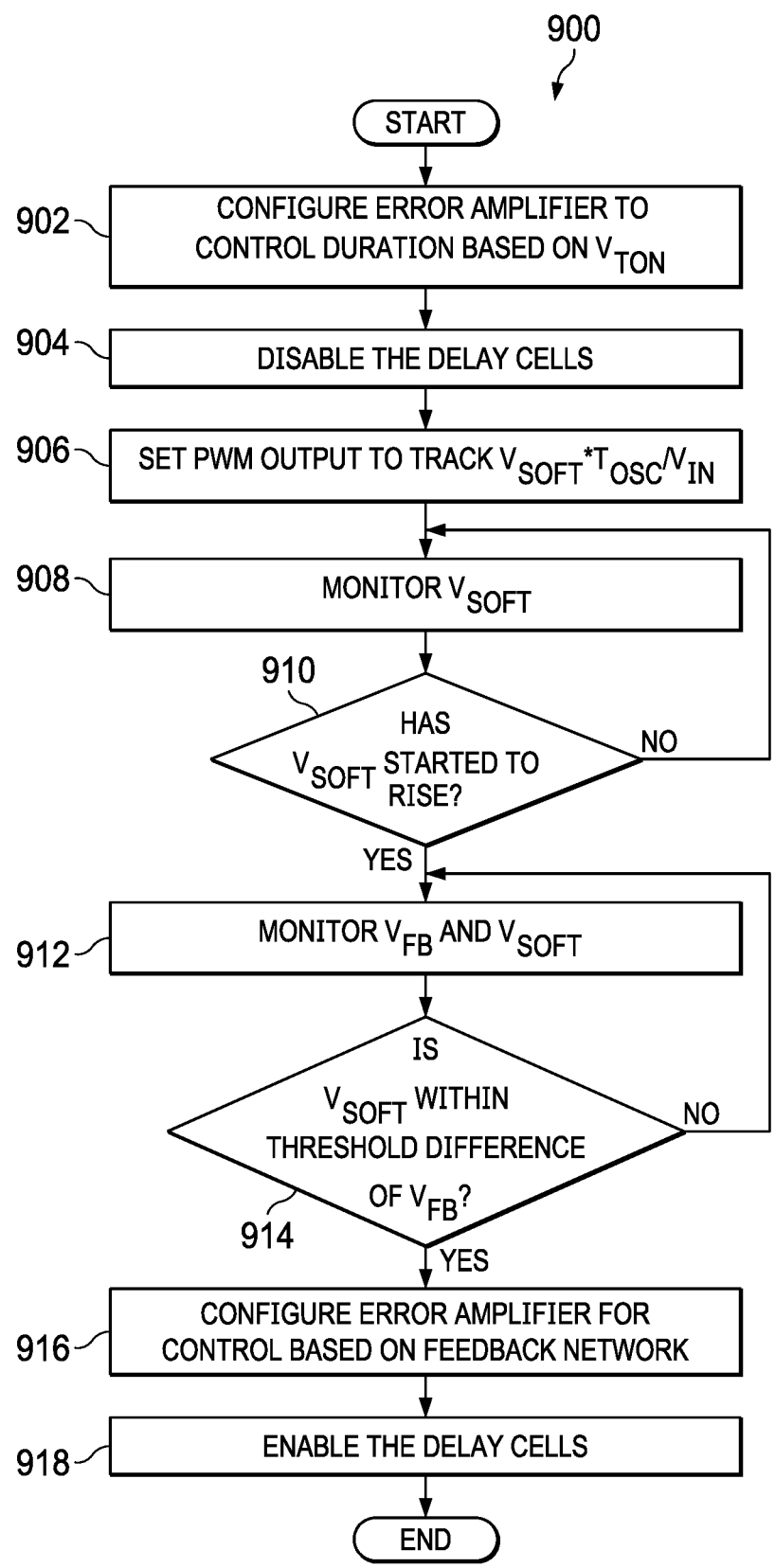
FIG. 9 is a flowchart representative of example machine readable instructions which may be executed to implement the example controller of FIGS. 1, 2, and 3.

A flowchart representative of example hardware logic, machine readable instructions, hardware implemented state machines, and/or any combination thereof for implementing the controller 102 of FIGS. 1, 2, and 3 is shown in FIG. 9. The machine readable instructions may be one or more executable programs or portion(s) of an executable program for execution by a computer processor such as the controller 102. The program may be embodied in software stored on a non-transitory computer readable storage medium such as non-volatile memory (e.g., read-only memory (ROM), electrically erasable programmable read-only memory (EEPROM), flash memory, etc.), volatile memory (e.g., Synchronous Dynamic Random Access Memory (SDRAM), Dynamic Random Access Memory (DRAM), etc., and/or any other type of random access memory (RAM) device), etc., or a memory associated with the controller 102, but the entire program and/or parts thereof could alternatively be executed by a device other than the controller 102 and/or embodied in firmware or dedicated hardware. Further, although the example program is described with reference to the flowchart illustrated in FIG. 9, many other methods of implementing the example controller 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Including and comprising (and all forms and tenses thereof) are used herein to be open ended terms. Thus, whenever a claim employs any form of include or comprise (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase at least is used as the transition term in, for example, a preamble of a claim, it is open-ended in the same manner as the term comprising and including are open ended. The term and/or when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase at least one of A and B is intended to refer to implementations including any of (1) at least one A, (2) at least one B, and (3) at least one A and at least one B. Similarly, as used herein in the context of describing structures, components, items, objects and/or things, the phrase at least one of A or B is intended to refer to implementations including any of (1) at least one A, (2)

at least one B, and (3) at least one A and at least one B. As used herein in the context of describing the performance or execution of processes, instructions, actions, activities and/or steps, the phrase at least one of A and B is intended to refer to implementations including any of (1) at least one A, (2) at least one B, and (3) at least one A and at least one B. Similarly, as used herein in the context of describing the performance or execution of processes, instructions, actions, activities and/or steps, the phrase at least one of A or B is intended to refer to implementations including any of (1) at least one A, (2) at least one B, and (3) at least one A and at least one B.

FIG. 9 is a flowchart representative of example machine readable instructions which may be executed to implement the example controller 102 of FIGS. 1, 2 and 3. The example machine readable instructions 900 begins at block 902 where the comparator 118 configures the error amplifier 108 to control the duration of the delay of the delay cells in the delay cells 110 based on the trimmed voltage signal $V_{TON}$. More specifically, at block 902, the comparator 118 enables and/or disables one or more of the first switch 126, the second switch 128, the third switch 130, and the fourth switch 132. For example, in the power converter system 100, the comparator 118 disables the first switch 126, enables the second switch 128, disables the third switch 130, and enables the fourth switch 132. Additionally, for example, in the power converter system 200, the comparator 118 disables the first switch 126, enables the second switch 128, disables the third switch 130, and enables the fourth switch 132. Alternatively, in the example power converter system 300, the example comparator 118 enables the fourth switch 132 and configures the eighth switch 310 such that the second terminal of the eighth switch 310 is coupled to the third terminal of the eighth switch 310.

In the illustrated example of FIG. 9, at block 904, the comparator 118 disables the delay cells 110. More specifically, the comparator 118 disables the fifth switch 134. At block 906, the feed forward voltage controller 116 sets the delay cells 110 such that the PWM signal is to track the product of the first voltage signal $V_{SOFT}$ and the period of the oscillator 112 divided by the input voltage signal $V_{IN}$. At block 908, the comparator 118 monitors the first voltage signal $V_{SOFT}$. At block 910, the comparator 118 determines whether the first voltage signal $V_{SOFT}$ has started to rise from zero volts. If the comparator 118 determines that the first voltage signal $V_{SOFT}$ has started to rise (block 910: YES), the machine readable instructions 900 proceeds to block 912. If the comparator 118 determines that the first voltage signal $V_{SOFT}$ has not started to rise (block 910: NO), the machine readable instructions 900 proceeds to block 908.

In the illustrated example of FIG. 9, at block 912, the comparator 118 monitors the feedback voltage signal $V_{FB}$ and the first voltage signal $V_{SOFT}$. At block 914, the comparator 118 determines whether the first voltage signal $V_{SOFT}$ is within a threshold difference of the feedback voltage signal $V_{FB}$. If the comparator 118 determines that the first voltage signal $V_{SOFT}$ is within a threshold difference of the feedback voltage signal $V_{FB}$ (block 914: YES), the machine readable instructions 900 proceeds to block 916. If the comparator 118 determines that the first voltage signal $V_{SOFT}$ is not within a threshold difference of the feedback voltage signal $V_{FB}$ (block 914: NO), the machine readable instructions 900 proceeds to block 912.

At block 916, in response to the first voltage signal $V_{FB}$ being within a threshold difference of the feedback voltage signal $V_{FB}$, the comparator 118 configures the error amplifier 108 to control the duration of each of the delay cells of the delay cells 110 in response to the feedback voltage signal $V_{FB}$. More specifically, the comparator 118 enables and/or disables one or more of the first switch 126, the second switch 128, the third switch 130, the fourth switch 132, or the eighth switch 310. For example, in the power converter system 100, the comparator 118 enables the first switch 126, disables the second switch 128, enables the third switch 130, and disables the fourth switch 132. Additionally, for example, in the power converter system 200, the comparator 118 enables the first switch 126, disables the second switch 128, enables the third switch 130, and disables the fourth switch 132. Alternatively, in the example power converter system 300, the example comparator 118 disables the fourth switch 132 and configures the eighth switch 310 such that the first terminal of the eighth switch 310 is coupled to the third terminal of the eighth switch 310. In the illustrated example of FIG. 9, at block 918, the comparator 118 enables the delay cells 110. More specifically, the comparator 118 enables the fifth switch 134.

From the foregoing, it will be appreciated that example methods, apparatus and articles of manufacture have been disclosed that prevent transients on the output of the power converter by smoothly transitioning the power converter from an off state to being controlled to output a voltage level equal to or greater than a pre-biased voltage level at the output of the power converter. Additionally, the examples disclosed herein prevent negative current and DCM operation by disabling the power converter until a soft startup voltage corresponding to the power converter is equal to or greater than a voltage level corresponding to the pre-bias voltage. The disclosed methods, apparatus and articles of manufacture improve the efficiency of using a computing device by reducing the power consumption of a device by preventing negative current flow and DCM operation of a power converter. The disclosed methods, apparatus and articles of manufacture improve the output signal of a power converter by reducing transients, thereby improving the functionality of one or more circuits and/or device coupled to the power converter. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a differential difference amplifier having first, second, third and fourth difference inputs, wherein the differential difference amplifier controls a delay cell duration responsive to a first voltage level at a first output of a voltage generator;
 a first switch coupled to the differential difference amplifier;
 a multiplexer coupled to the differential difference amplifier and the first switch, wherein the multiplexer configures an input signal provided to the first difference input;
 a second switch coupled to a delay cell to enable the delay cell; and
 a trigger coupled to a voltage terminal, an output of a power converter, the differential difference amplifier, the first switch, and the second switch, wherein, responsive to a second voltage level at a second output of the voltage generator being within a threshold difference of an output voltage level at the output of the power converter, the trigger configures the first switch, the multiplexer, and the second switch to enable the differential difference amplifier to control the power converter in response to the output voltage level and the second voltage level.

2. The apparatus of claim 1, including a delay-based pulse width modulator, in which the delay-based pulse width modulator includes a plurality of delay cells including the delay cell, and a duration of a pulse generated by the delay-based pulse width modulator corresponds to a subset of the plurality of delay cells that are active.

3. The apparatus of claim 1, in which the first voltage level is a reference voltage level corresponding to the delay cell duration, the second voltage level is a reference voltage level corresponding to soft startup of the power converter, and the output voltage level corresponds to a pre-biased voltage level at a load of the power converter.

4. The apparatus of claim 1, including a first resistor, a second resistor, and a capacitor.

5. The apparatus of claim 4, in which:
the first switch is coupled in parallel to the capacitor, the second switch is coupled to an oscillator and the delay cell, and the multiplexer is coupled to the second output of the voltage generator, the output of the power converter, and the first difference input;
the second difference input is coupled to the output of the power converter; and
the third and fourth difference inputs are coupled to the first output of the voltage generator.

6. The apparatus of claim 5, in which the first switch, the second switch, and the multiplexer are configured such that the output of the power converter is coupled to the first difference input if the first switch is closed and the second switch is open, and the second output of the voltage generator is coupled to the first difference input if the first switch is open and the second switch is closed.

7. The apparatus of claim 1, including a latch and an inverter, wherein the latch is coupled to an output of the trigger, the multiplexer, the first switch, and the inverter, and the inverter is coupled to the second switch.

* * * * *